United States Patent
Moriya

(10) Patent No.: US 10,922,571 B2
(45) Date of Patent: Feb. 16, 2021

(54) INFORMATION PROCESSING APPARATUS, INFORMATION PROCESSING METHOD, AND PROGRAM

(71) Applicant: NEC CORPORATION, Tokyo (JP)

(72) Inventor: Atsushi Moriya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 124 days.

(21) Appl. No.: 16/085,259

(22) PCT Filed: Jan. 4, 2017

(86) PCT No.: PCT/JP2017/000015
§ 371 (c)(1),
(2) Date: Sep. 14, 2018

(87) PCT Pub. No.: WO2017/163532
PCT Pub. Date: Sep. 28, 2017

(65) Prior Publication Data
US 2019/0080192 A1    Mar. 14, 2019

(30) Foreign Application Priority Data
Mar. 22, 2016 (JP) .............................. JP2016-056565

(51) Int. Cl.
    *G06Q 10/08*      (2012.01)
    *G06K 9/20*      (2006.01)
    *B65G 1/137*      (2006.01)
    *G06N 20/00*      (2019.01)
    (Continued)

(52) U.S. Cl.
    CPC ......... *G06K 9/2054* (2013.01); *B65G 1/1371* (2013.01); *G06N 20/00* (2019.01); *G06Q 10/087* (2013.01); *B65G 2203/041* (2013.01); *G06K 2009/3225* (2013.01); *G06Q 30/06* (2013.01)

(58) Field of Classification Search
CPC ......... G06K 9/2054; G06K 2009/3225; B65G 1/1371; B65G 2203/041; G06Q 10/087; G06Q 30/06; G06N 20/00
See application file for complete search history.

(56) References Cited

U.S. PATENT DOCUMENTS 6,155,438 A * 12/2000 Close .................. A47F 1/125
                                              211/119.003
10,002,342 B1 * 6/2018 Oikarinen ............ G05D 1/042
(Continued)

FOREIGN PATENT DOCUMENTS

JP      11-281754 A      10/1999
JP      2000-184361 A      6/2000
(Continued)

OTHER PUBLICATIONS

International Search Report for PCT/JP2017/000015 dated Feb. 21, 2017 [PCT/ISA/210].

*Primary Examiner* — Christopher M Brandt
(74) *Attorney, Agent, or Firm* — Sughrue Mion, PLLC

(57) ABSTRACT

Provided is an information processing apparatus including a detection unit that detects a difference from a previously detected marker in a predetermined marker, by image recognition processing on an image obtained by image-capturing an arrangement place of an article; and an execution unit that executes a process in accordance with the difference.

11 Claims, 23 Drawing Sheets

(51) Int. Cl.
G06Q 30/06 (2012.01)
G06K 9/32 (2006.01)

(56) References Cited

U.S. PATENT DOCUMENTS

| | | | | |
|---|---|---|---|---|
| 2005/0269412 A1* | 12/2005 | Chiu | ................... | G06K 9/4633 |
| | | | | 235/462.03 |
| 2009/0121017 A1* | 5/2009 | Cato | ................... | G06Q 10/087 |
| | | | | 235/385 |
| 2010/0237091 A1* | 9/2010 | Garson | ................... | G07F 9/026 |
| | | | | 221/226 |
| 2015/0092991 A1* | 4/2015 | Burke | ................ | G06K 9/00791 |
| | | | | 382/105 |
| 2017/0193430 A1* | 7/2017 | Barreira Avegliano | ..................... | |
| | | | | G06T 7/74 |

FOREIGN PATENT DOCUMENTS

| | | |
|---|---|---|
| JP | 2011-61586 A | 3/2011 |
| JP | 2012-174154 A | 9/2012 |
| JP | 2013-114596 A | 6/2013 |
| JP | 2015-176227 A | 10/2015 |
| JP | 2015-210651 A | 11/2015 |

\* cited by examiner

FIG. 7

| DETECTION CONDITION | | AREA THAT ACCOUNTS FOR PRESCRIBED PERCENTAGE OR GREATER OF ENTIRE AREA OF MARKER (M0002) IS RECOGNIZED |
|---|---|---|
| PROCESSING | True | NOTIFICATION (DETECTION RESULT INFORMATION (MARKER DETECTION) IS STORED) |
| | False | NOTHING IS DONE (DETECTION RESULT INFORMATION (MARKER NON-DETECTION) IS STORED) |

| DETECTION CONDITION RANGE OF MARKER (M003) | | 0~1 | 2~5 | 6~7 |
|---|---|---|---|---|
| PROCESSING | True | NOTIFY LEVEL 1 | NOTIFY LEVEL 2 | NOTIFY LEVEL 3 |
| | False | NOTHING IS DONE | NOTHING IS DONE | NOTHING IS DONE |

230

| SHELF PLATE No. T1001 | | |
|---|---|---|
| DATE AND TIME | NUMERAL (Min) | DIFFERENCE |
| 2016/02/24 10:00 | 0 | |
| 2016/02/24 11:31 | 6 | +6 |
| 2016/02/24 11:46 | 5 | −1 |
| 2016/02/24 12:40 | 4 | −1 |
| 2016/02/24 13:00 | 0 | |
| 2016/02/24 13:20 | 6 | +6 |
| ⋮ | ⋮ | ⋮ |

| SHELF PLATE No. T1002 | | |
|---|---|---|
| DATE AND TIME | NUMERAL (Min) | DIFFERENCE |
| 2016/02/24 10:00 | 0 | |
| 2016/02/24 11:35 | 6 | +6 |
| 2016/02/24 11:37 | 1 | −5 |
| ⋮ | ⋮ | ⋮ |

INFORMATION PROCESSING APPARATUS, INFORMATION PROCESSING METHOD, AND PROGRAM

CROSS REFERENCE TO RELATED APPLICATIONS

This application is a National Stage of International Application No. PCT/JP2017/000015, filed on Jan. 4, 2017, which claims priority from Japanese Patent Application No. 2016-056565, filed on Mar. 22, 2016, the contents of all of which are incorporated herein by reference in their entirety.

TECHNICAL FIELD

The present invention relates to an information processing apparatus, an information processing method, and a program.

BACKGROUND ART

An example of an apparatus that surveils a situation of commodities that is placed on display is disclosed in Patent Document 1. Based on image data of an image capture camera, a surveillance apparatus in Patent Document 1 detects whether or not a commodity is moved, and detects a direction of a person that stays in the vicinity of an area where the commodities are arranged, and based on a result of the detection, outputs warning information. For example, in a case where it is detected that a commodity disappears from a commodity arrangement area and where it is detected that a customer is not facing a direction of the commodity arrangement area, a message notifying that there is a likelihood that the commodity has disappeared due to a wrongful act such as shoplifting is output.

Furthermore, In Patent Document 2, an inventory management apparatus is disclosed that checks for stock-out. The inventory management apparatus that is disclosed in Patent Document 2 includes a mark that is printed in ink with high reflectivity with respect to light in an infrared region, an object to be managed that is positioned on the mark, an image-capturing unit that image-captures the mark, an image processing unit that identifies the mark from a captured image, and a central processor which determines, in a case where the mark is not recognized, that the object to be managed is present and a stock is available, and which determines, in a case where the mark is recognized, that the object to be managed is not present and acquires information on the object to be managed that is not present from the identified mark. With this configuration, the stock-out can be checked for in an easier manner.

RELATED DOCUMENT

Patent Document

[Patent Document 1] Japanese Patent Application Publication No. 2015-176227
[Patent Document 2] Japanese Patent Application Publication No. 11-281754

SUMMARY OF THE INVENTION

Technical Problem

In the technologies in the patent documents, which are described above, the disappearance of the commodity is detected, the direction of the person who stays in the vicinity of the commodity that disappears is detected, the detection of a wrongful act such as shoplifting or running out of the commodity is detected, and the commodity that runs our is identified. Thus, the inventory management can be performed. However, a processing load on the information processing apparatus increases.

An object of the present invention, which was made in view of the situations described above, is to provide an information processing apparatus, an information processing method, and a program that detect an increase and a decrease in the number of commodities in a simple and efficient manner.

Solution to Problem

In aspects of the present invention, the following configurations are employed in order to solve the problems described above.

A first aspect relates to an information processing apparatus.

According to the first aspect, there is provided an information processing apparatus including: a detection unit that detects a difference from a previously detected marker in a predetermined marker, by image recognition processing on an image obtained by image-capturing an arrangement place of an article; and an execution unit that executes a process in accordance with the difference.

A second aspect relates to an information processing method that is executed by at least one computer.

According to the second aspect, there is provided an information processing method executed by an information processing apparatus, the method including: detecting a difference from a previously detected marker in a predetermined marker, by image recognition processing on an image obtained by image-capturing an arrangement place of an article; and executing a process in accordance with the difference.

Note that according to another aspect of the present invention, there may be provided a program that causes at least one computer to perform the method according to the second aspect and there may be provided a computer-readable storage medium on which the program is stored. The storage media include a non-transitory tangible medium.

The computer programs include a computer program code that, when caused by the computer to be executed, causes the computer to perform the information processing method on the information processing apparatus.

Note that results which are obtained by converting any combination of the constituent elements described above and an expression in the present invention in the method, the apparatus, the system, the storage medium, the computer program, and the like is also effective as aspects of the present invention.

Furthermore, various constituent elements do not necessarily need to be present independently of each other. A plurality of constituent elements may be formed as one member, one constituent element may be formed as a plurality of members, a certain constituent element may be a part of any other constituent element, a part of a constituent element and a part of any other constituent element may be present redundantly, and so forth.

Furthermore, a plurality of procedures are described in sequential order in the method and the computer program according to the present invention, but the sequential order of the descriptions does not limit an order in which a plurality of procedures are executed. Therefore, when the method and the computer program according to the present invention are implemented, the order of a plurality of procedures can be changed within a permissible range in contents.

Moreover, a plurality of procedures in the method and the computer program according to the present invention are not limited to being individually executed at different timings. Therefore, when any other procedure is executed while a certain procedure is executed, a timing at which the certain procedure is executed and a timing at which the any other procedure is executed may overlap partially, and so forth.

Advantageous Effects of Invention

According to each aspect described above, an information processing apparatus, an information processing method, and a program that detect an increase and a decrease in the number of articles of commerce in a simple and efficient manner.

BRIEF DESCRIPTION OF THE DRAWINGS

The objects described above, and other objects, features and advantages are further made apparent by suitable example embodiments that will be described below and the following accompanying drawings.

FIG. 7 is a diagram illustrating an example of a condition for processing by the information processing apparatus according to the present example embodiment.

FIG. 15 is a diagram illustrating an example of the condition for the processing by the information processing apparatus according to the present example embodiment.

DESCRIPTION OF EMBODIMENTS

Figure 1:
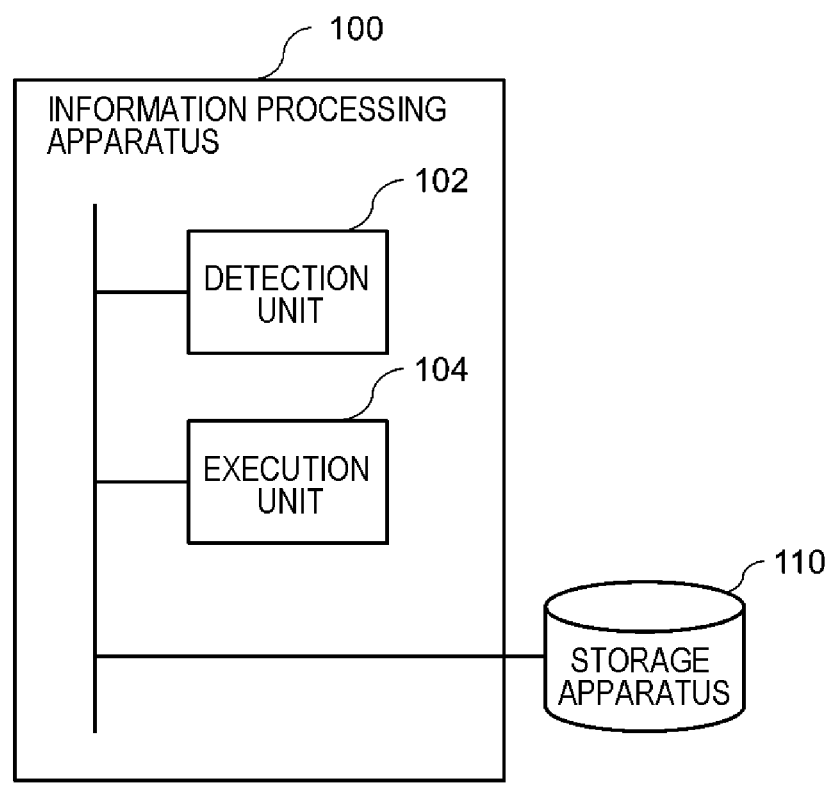
FIG. 1 is a functional block diagram logically illustrating a configuration of an information processing apparatus according to an example embodiment of the present invention.

Example embodiments of the present invention will be described below with reference to the drawings. Moreover, in all the drawings, the same constituent elements are given the same reference numerals, and descriptions thereof will not be repeated.

First Example Embodiment

An information processing apparatus according to a first example embodiment of the present invention, an information processing method, and a program will be described below.

FIG. 1 is a functional block diagram logically illustrating a configuration of an information processing apparatus 100 according to an example embodiment of the present invention.

The information processing apparatus 100 includes a detection unit 102 that detects a marker that is determined in advance, which is different from a commodity, by image recognition processing on an image obtained by image-capturing a place on which a commodity is placed, and an execution unit 104 that executes a process that is determined in advance, when a result of the detection of the marker satisfies a condition that is determined in advance.

The information processing apparatus 100 is further connected to a storage apparatus 110 in an accessible manner.

The storage apparatus 110, for example, is a hard disk, a Solid State Drive (SSD), a memory card, or the like, and may be included in the information processing apparatus 100 and may be an external apparatus.

Figure 2:
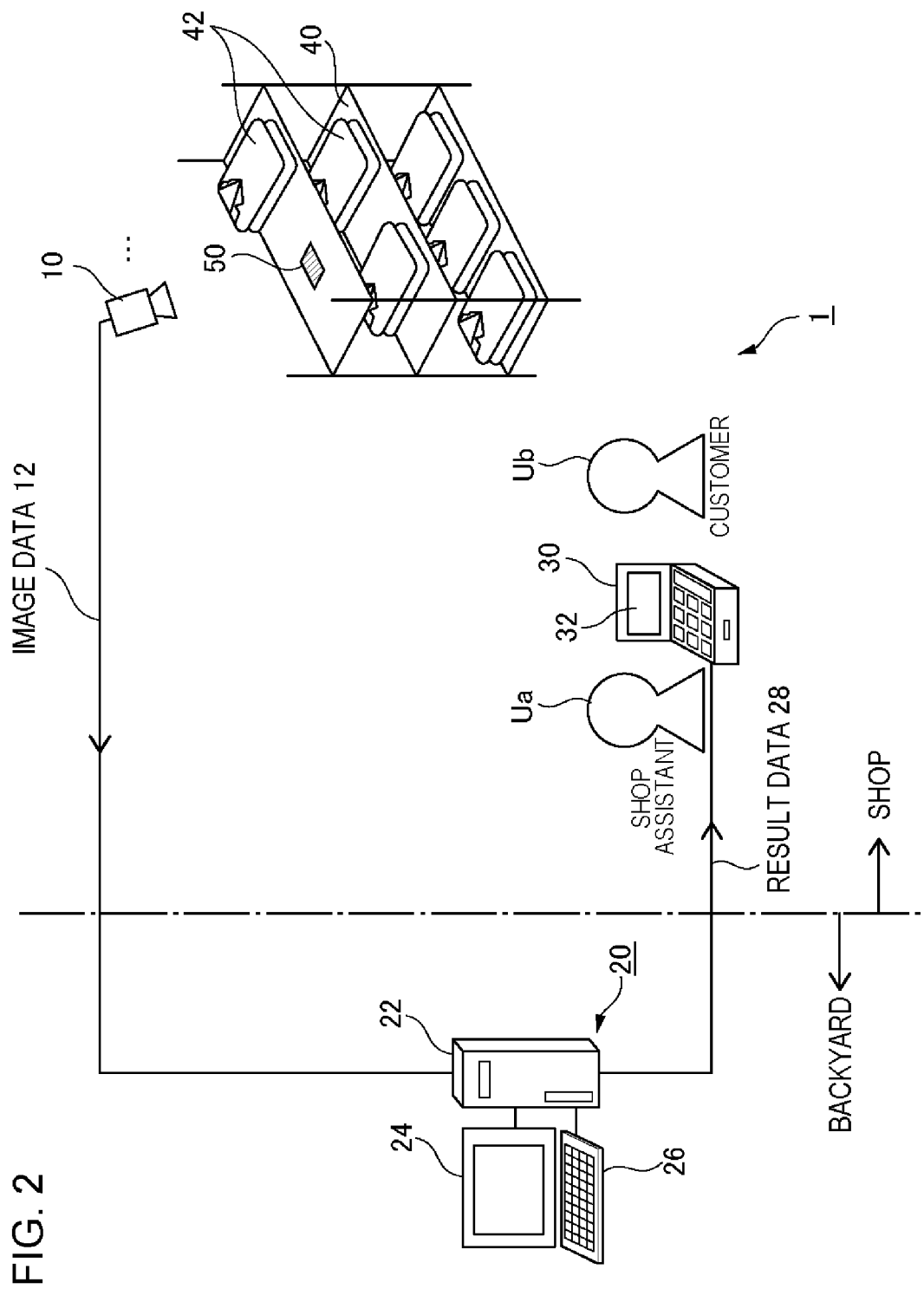
FIG. 2 is a diagram schematically illustrating a system configuration of an information processing system which includes the information processing apparatus according to the example embodiment of the present invention.

FIG. 2 is a diagram schematically illustrating a system configuration of an information processing system 1 which includes the information processing apparatus 100 according to the example embodiment of the present invention.

In each of the figures in the present specification, a part of a configuration that does not substantially relate to the gist of the present invention is not illustrated.

The information processing system 1 has an image capture camera 10, a server computer 20, and a cash register 30.

The image capture camera 10 is one that image-captures a commodity shelving unit 40 in a shop, a stock storage warehouse, or the like. In FIG. 2, one image capture camera 10 is illustrated, but a plurality of image capture cameras 10 may be installed. The image capture camera 10 image-captures commodities 42 that are placed on display or stored on the commodity shelving unit 40, and a marker 50 that is installed in a position that is determined in advance in the vicinity of a place where the commodities 42 are placed. A plurality of commodities 42 are assumed to be placed on the commodity shelving unit 40. For example, in a case where one or more commodities 42 remain on the commodity shelving unit 40, at least a part of the marker 50 is hidden by the commodities 42 and the at least a part of the marker 50 is also not present image data 12 that is image-captured by the image capture camera 10.

The marker 50 is assumed to be one that is different from the commodity 42. The marker 50, for example, can be expressed in various forms, such as a logotype, a symbol mark, a symbol, a design, a pattern, a photograph, a picture, a letter, a number, a scratch, and a barcode, and may be expressed as a combination of two or more of these. Furthermore, the marker 50 may not be associated with the commodity 42, and may have a meaning and may not have a meaning. Furthermore, the marker 50 is not particularly limited in terms of a size, a shape, a color scheme, the degree of glossiness, the presence or absence of light emission, the number, and the like. Various forms are considered for the marker 50. Furthermore, the marker 50 may not have a planar structure, and may have a three-dimensional structure. Furthermore, in the example embodiments that will be described below, a configuration will be described in which processing varies according to a type of the marker 50 or the number of markers 50.

A method of installing the marker 50 is not particularly limited. For example, the marker 50 may be pasted on, be put on, be hung from, be attached to, be buried in, be printed on, or be drawing on a surface of a shelf plate, a rear plate, or a prop of the commodity shelving unit 40. Furthermore, an installation place of the marker 50 may be not only the commodity shelving unit 40, but also at least one of one piece of furniture, a wall, a ceiling, a floor, and a fixture in the vicinity of the place where the commodity 42 is placed.

Furthermore, the marker 50 may be installed on the commodity shelving unit 40 or the like. In addition, at least a part of the commodity shelving unit 40 itself, or at least a part of any of one piece of furniture, a wall, a ceiling, a floor, and a fixture in the vicinity of the place where the commodity 42 is placed may be used as the marker 50. Alternatively, a display may be provided on a part of, or in the vicinity of (for example, on a rear surface, a shelf plate, or the like), the commodity shelving unit 40, and the marker 50 may be displayed on the display.

Furthermore, in a specification in which the entire commodity shelving unit 40 or each shelf plate is used as the marker 50, commodities that are accommodated are different in size, shape, color, and the like for each commodity shelving unit 40 or each shelf plate. Because of this, each commodity shelving unit 40 or each shelf plate in which the commodities are accommodated can be used as the marker 50. For example, in an image area for image capture, which corresponds to each commodity shelving unit 40 or each shelf plate, in a case where a certain amount of difference is detected while time elapses, a predetermined message (an alert information relating to the occurrence of a large-scale theft or the like) may be transmitted, and a condition and details of a process may be set for every commodity shelving unit 40 or every shelf plate.

It is preferable that a relationship in arrangement among an installation position of the marker 50, an installation position (additionally, setting of an image capture direction, a viewing angle, and an image capture range is also included) of the image capture camera 10, and an article (hereinafter also referred to as a "commodity") 42 is as is described below.

The marker 50 and the image capture camera 10 are installed in such a manner as to establish a positional relationship such that the number, or an area of markers 50 present within an image capture range of the image capture camera 10 changes between a case where the commodity 42 is present and a case where the commodity 42 disappears.

Figure 3A:
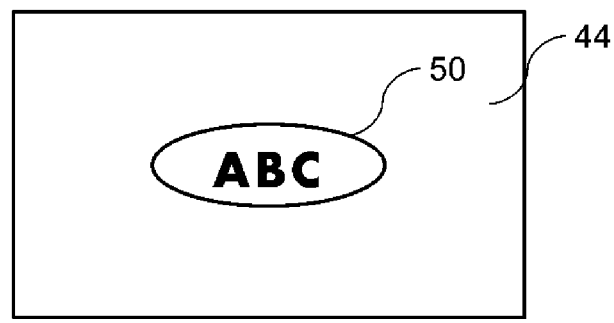
FIGS. 3A-3C illustrate an installation example of a marker according to the present example embodiment.
Figure 3B:
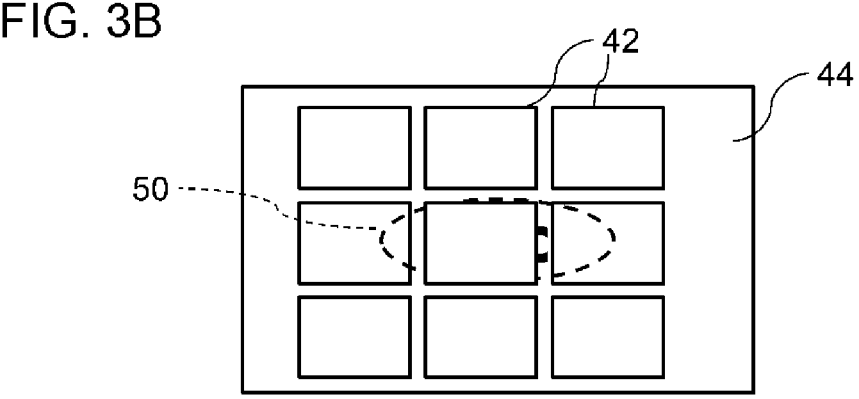
Figure 3C:
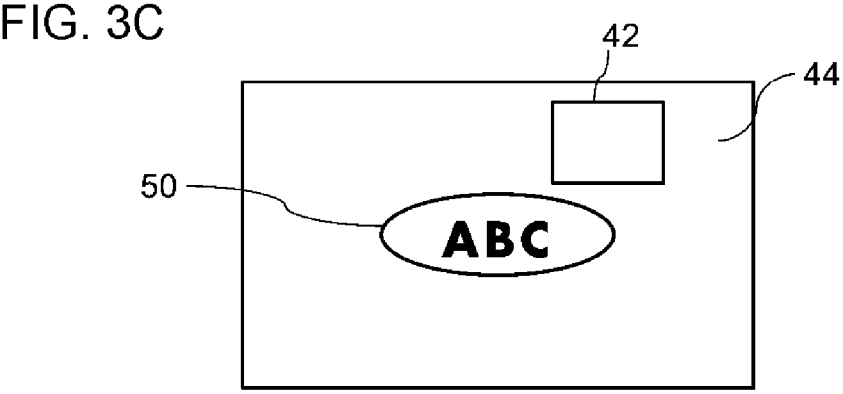

FIG. 3 illustrates an installation example of the marker 50 according to the present example embodiment. For example, FIG. 3A illustrates a scene in which the marker 50 is pasted on a surface of a shelf plate 44 of the commodity shelving unit 40. FIG. 3B illustrates a scene in which a plurality of commodities 42 are placed on the shelf plate 44 and in which the marker 50 is hidden by the commodity 42 from view. FIG. 3C illustrates a scene in which almost all of the commodities 42 disappear and in which the marker 50 appears.

The image capture camera 10 is provided above the shelf plate 44 of the commodity shelving unit 40. Moreover, the image capture direction, the viewing angle, and the image capture range of the image capture camera 10 are set to allow image-capturing in which when the commodity 42 is present, an image of the marker 50 is hardly captured in the image data 12 and when the commodity 42 disappears, the image of the marker 50 is captured into the image data 12.

With reference again to FIG. 2, the image data 12 obtained by image-capturing with the image capture camera 10 is transmitted to the server computer 20. A method of making a connection between and performing communication between the image capture camera 10 and the server computer 20 is not particularly limited. However, predetermined ciphering processing and an authentication procedure are assumed to be performed, and thus, a secure communication environment is assumed to be provided. The connection may be a wired one or a wireless one.

Furthermore, a direct connection or an indirection connection may be made between the image capture camera 10 and the server computer 20.

For example, the image data 12 obtained by image-capturing with the image capture camera 10 may be transmitted directly to the information processing apparatus 100, and the information processing apparatus 100 may sequentially receive the transmitted image data 12. Alternatively, a storage apparatus (for example, the storage apparatus 110) that is accessible by the image capture camera 10 and the information processing apparatus 100 may be provided. The image data 12 obtained by image-capturing with the image capture camera 10 may be stored in the storage apparatus 110, and the information processing apparatus 100 may read and acquire the stored image data 12 from the storage apparatus 110.

In the present example embodiment, for example, a web camera, such as an Internet Protocol (IP) camera, is used as the image capture camera 10. The IP camera, for example, has a wireless Local Area Network (LAN) communication function, and may be connected to the server computer 20 through a relay an apparatus (not illustrated) such as a router.

In the present example embodiment, a configuration is employed in which the image data 12 is output from the image capture camera 10, but no limitation to this is imposed. The image data 12 may be image data on at least one of a moving image and a still image. A data format is also not particularly limited. Various formats can be employed in accordance with specifications, standards, performances, and the like of the image capture camera 10 and the server computer 20.

In the present example embodiment, for example, the image capture camera 10 uses formats that comply with Open Network Video Interface Forum (ONVIF). The image data 12, for example, may be stored in a file format that complies with Motion-Joint Photographic Experts Group (JPEG), or H.264 (Moving Picture Experts Group phase 4 (MPEG-4) Part 10 Advanced Video Coding (AVC)), in the storage apparatus 110.

Figure 4:
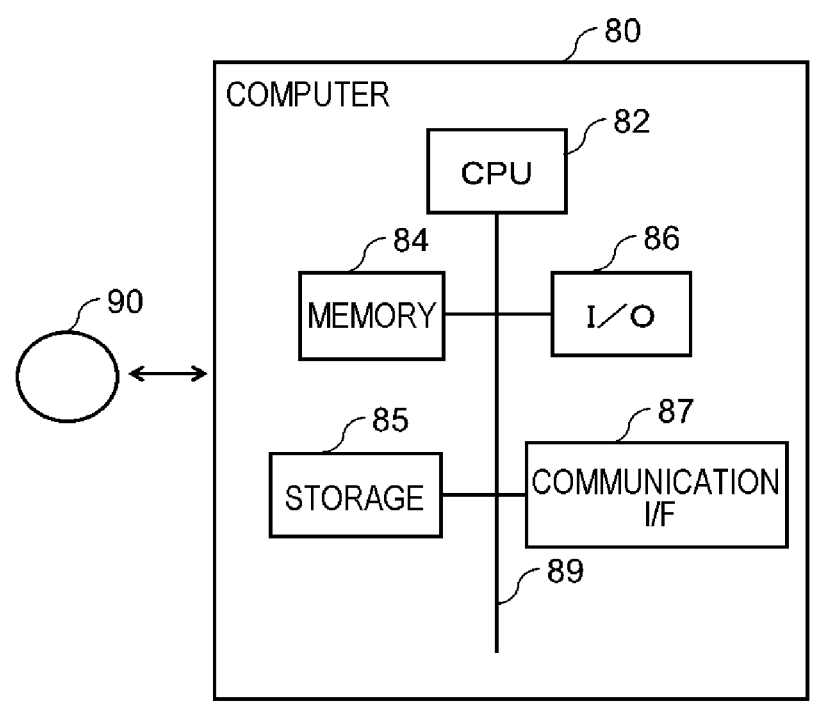
FIG. 4 is a diagram illustrating an example of a configuration of a computer according to the example embodiment of the present invention.

The server computer 20, for example, includes a main body 22, a monitor 24, and a keyboard 26. The server computer 20 is a computer that realizes the information processing apparatus 100 in FIG. 1, and an example of a configuration of the main body 22, which will be described below, is illustrated in FIG. 4.

The monitor 24 is a liquid crystal display or the like. Various operation screens of the information processing apparatus 100 according to the present example embodiment, result data 28 of the detection of the marker 50 by the detection unit 102 of the information processing apparatus 100, or the like are displayed on the monitor 24. Furthermore, the result data 28 of the detection of the marker 50 may be output to the cash register 30 that will be described below.

The keyboard 26 is an example of an operation unit of the server computer 20. As the operation unit of the server computer 20, a mouse, a touch panel that is integrally combined with the monitor 24, or the like, is considered in various ways.

The cash register 30, for example, has a shop-assistant display 32, a customer display (not illustrated), a scanner (not illustrated), an input button (not illustrated), a drawer (not illustrated), and a camera (not illustrated).

The shop-assistant display 32 is a display that has a function of a touch panel. Various screens are displayed on the shop-assistant display 32. Along with this, the shop-assistant display 32 receives input that is necessary for a shop assistant Ua to operate the cash register 30. The customer display is a display that has a function of a touch panel. Various screens are displayed on the customer display. Along with this, the customer display may receive input that is necessary for a customer to operate a screen.

The scanner is a handy-type scanner or a stationary-type scanner, and is various types of readers that are used for registering a commodity to be paid for. The scanner is a bar-code reader that reads a code that is attached to a commodity, or a camera for image-recognizing the commodity or the code that is attached to the commodity. The input button is an input unit to receive a pressing-down operation by the shop assistant Ua. A coin or a paper currency is stored in the drawer. The camera may image-capture a face of a customer Ub who stays in the vicinity of the cash register 30, for example, the customer Ub who pays for a commodity in front of the cash register 30.

As described above, the cash register 30 may be connected to the server computer 20, and may receive the result data 28 of the detection from the server computer 20. Based on the received result data 28 of the detection, the result of the detection of the marker 50 may be displayed on the shop-assistant display 32 of the cash register 30. A method of making a connection between and performing communication between the cash register 30 and the server computer 20 is not particularly limited. However, predetermined ciphering processing and an authentication procedure are assumed to be performed, and thus, a secure communication environment is assumed to be provided. The connection may be a wired one or a wireless one. Furthermore, in FIG. 2, only one cash register 30 is illustrated, but a plurality of cash registers 30 may be provided.

In the present example embodiment, any one of the cash register 30 and the server computer 20 (the information processing apparatus 100) is configured with a computer. FIG. 4 is a diagram illustrating an example of a configuration of this computer.

The computer 80 according to the present example embodiment includes a Central Processing Unit (CPU) 82, a memory 84, a program 90 that implements constituent elements which are illustrated in FIG. 1, which is loaded into the memory 84, a storage 85 in which the program 90 is stored, an Input/Output (I/O) 86, and a network connection interface (a communication Interface (I/F) 87).

The CPU 82, the memory 84, the storage 85, the I/O 86, and the communication I/F 87 are connected to each other through a bus 89, and the entire information processing apparatus 100 is controlled by the CPU 82. However, a method of connecting the CPU 82 and the others to each other is not limited to a bus connection.

The memory 84 is a memory, such as a Random Access Memory (RAM) or a Read Only Memory (ROM). The storage 85 is a storage device such as a hard disk, a Solid State Drive (SSD), or a memory card.

The storage 85 may be a memory such as a RAM or a ROM. The storage 85 may be provided inside of the computer 80, and, if accessible by the computer 80, may be provided outside of the computer 80 and may be connected to the computer 80 in a wired or wireless manner. Alternatively, the storage 85 may be removably provided to the computer 80.

The CPU 82 loads the program 90, which is stored in the storage 85, into the memory 84, for execution, and thus can implement a function of each of the units of the information processing apparatus 100 in FIG. 1.

The I/O 86 performs input and output control of data and a control signal between the computer 80 and any other input and output devices. Examples of any other input and output device include input devices (not illustrated), such as the keyboard 26, a touch panel (not illustrated), a mouse (not illustrated), and a microphone (not illustrated), output devices (not illustrated), such as a display, a printer, and speaker, and an interface between one of these input and output devices and the computer 80, which are connected to the computer 80. Moreover, the I/O 86 may perform control of the input and output of data into and from other devices (not illustrated) which perform reading from and writing to a storage medium.

The communication I/F 87 is a network connection interface for performing communication between the computer 80 and an external apparatus. The communication I/F 87 may be a network interface for connecting to a wired communication line, and may be a network interface for connection to a wireless communication line.

Each of the constituent elements of the information processing apparatus 100 in FIG. 1 according to the present example embodiment is realized by any combination of a hardware piece of the computer 80 (the server computer 20) in FIG. 4 and a software piece. Then, it is apparent to a person skilled in the art that various modifications to a method and an apparatus for such realization are present. A functional block diagram illustrating the information processing apparatus according to each of the example embodiments, which will be described below, illustrates a block on a per-logical function basis instead of a configuration on a per-hardware basis.

The information processing apparatus 100 may be configured with a plurality of computers 80, and may be realized by a virtual server. In the present example embodiment, the information processing apparatus 100 is configured with the server computer 20, but no limitation to this is imposed.

With reference again to FIG. 1, in the information processing apparatus 100, the detection unit 102 detects the marker 50 by the image recognition processing of an image obtained by image-capturing the place (the commodity shelving unit 40) where the commodities 42 are placed. As illustrated in FIG. 2, the information processing apparatus 100 (the server computer 20) acquires the image data 12 from the image capture camera 10.

In the present specification, the term "acquisition" means at least one of an act (active acquisition) in which an apparatus itself fetches data or information that is stored in any other apparatus or a storage medium, for example, an act in which the apparatus itself makes a request to any other apparatus for data or information to receive the data or the information, an act in which the apparatus itself accesses any other apparatus or the storage medium to read data or information, or the like, and an act (a passive act) in which data or information that is output from any other apparatus is input into an apparatus, for example, an act in which the apparatus receives data or information that is delivered (transmitted, push-notified, or the like), or the like. Furthermore, the term "acquisition" also includes an act of selecting data or information from among pieces of received data or information, for acquisition and an act of selecting data or information from among pieces of delivered data or information, for reception.

FIG. 5 is a diagram illustrating an example of a data structure of a storage unit, which relates to each piece of information that is stored in the storage apparatus 110 that is accessed by the information processing apparatus 100 according to the present example embodiment.

Figure 5A:
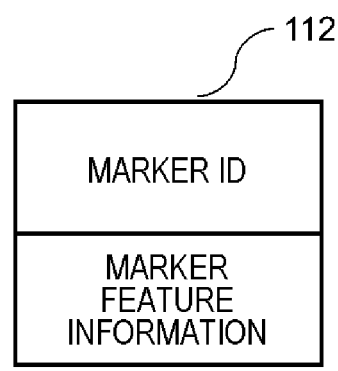
FIGS. 5A-5B are diagrams illustrating an example of a data structure of a storage unit, which relates to each piece of information that is stored in a storage apparatus that is accessed by the information processing apparatus according to the present example embodiment.

Identification information (a marker ID) on the marker 50, which is determined in advance, and feature information on the marker 50, are stored in the marker information storage unit 112 in FIG. 5A. The feature information on the marker 50, for example, may be image data on the marker 50, and may be feature information that at least includes a feature point which is extracted from at least a part of the marker 50 and a feature amount of the feature point. Furthermore, in a case where there is one type of markers 50 detected by the information processing apparatus 100, the identification information on the marker 50 may be dispensed with.

Moreover, information on a relative position to an installation area of the marker 50, a relative position to any other marker 50, or the like may be included.

The feature point of the marker 50 and the feature amount of the feature point have the number of feature points that are necessary for the detection unit 102 to detect the marker 50 from the image data 12, and the feature amount of each feature point. Performance of the image recognition processing that is used by the detection unit 102, or the like may be determined by a type of the marker 50.

Figure 5B:
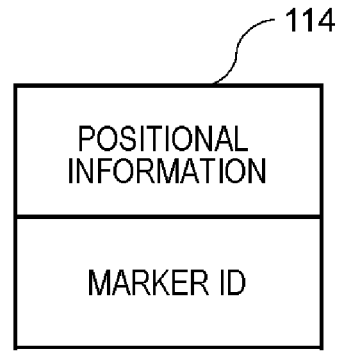

The identification information on the marker 50 and information on a position in which the marker 50 is installed are stored, in an associated manner, in a marker positional-information storage unit 114 in FIG. 5B. An example in which the marker ID is associated with the positional information is illustrated in FIG. 5B, but the positional information that is associated with every marker may be stored.

Positional information on the marker 50 is information that can identify a place where the marker 50 is installed. For example, at least one of information indicating a store floor, information indicating an area on a floor, information indicating the commodity shelving unit 40, and information indicating a position of a shelf within the commodity shelving unit 40 or a position (which, for example, is expressed with coordinates or a relative position to a reference) on the shelf is included. Alternatively, the positional information on the marker 50 may be information that identifies the image capture camera 10 that image-captures the marker 50. Moreover, in a case where the image capture range of the image capture camera 10 is changeable, information that identifies the image capture range of the image capture camera 10 that corresponds to the position in which the marker 50 is installed may be included.

Furthermore, positional information that is acquired from a Global Positioning System (GPS), which corresponds to the position in which the marker 50 is installed is also not excluded.

For example, the detection unit 102 extracts a feature from an image that is captured by the image capture camera 10, by the image recognition processing, and compares a feature amount of the feature that is extracted and a feature amount of the marker 50. In a case where an area that corresponds to at least a part of the marker 50 has a degree of similarity that is equal to or more than a threshold, the area is detected as the maker 50.

The reason for using at least part of the area of the marker 50 instead of the entire area, as will be described below, is because there is a case where the detection of the marker 50 is desired although a part of the marker 50 is hidden by the commodity 42. In a case where a part of the marker 50 is hidden by the commodity 42 and the entire area of the marker 50 is recognized, the marker 50 not being detected may be defined as a detection condition. In such a case, the entire area of the marker 50 may be set as comparison targets.

Figure 6:
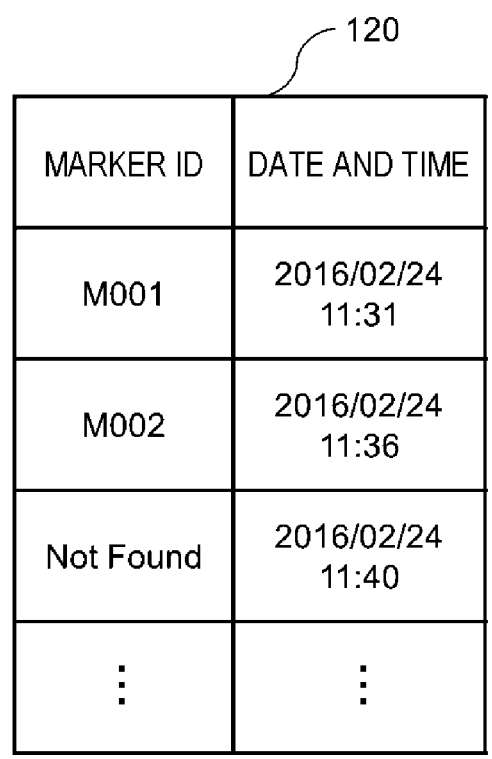
FIG. 6 is a diagram illustrating an example of a data structure of a detection result storage unit of the storage apparatus that is accessed by the information processing apparatus according to the present example embodiment.

A result of the detection of the marker 50 detected by the detection unit 102 is stored in a detection result storage unit 120 in FIG. 6.

As illustrated in FIG. 6, detection date and time information is stored in the detection result storage unit 120 in a manner that is associated with a marker ID of the detected marker 50. In this example, a configuration is employed in which a detection date and time is associated with every detected marker 50, but in another example, the marker ID of the marker 50 that is detected with a detection date and time may be associated with each other.

Moreover, feature information on an image area that corresponds to the marker 50 which is extracted from an image may be further stored in the detection result storage unit 120 in association therewith.

The detection unit 102 may further extract information that is embedded in advance into the marker 50, for example, various pieces of information on the commodity 42 that are included in a QR code (a registered trademark), from the image area that corresponds to the marker 50. For example, various pieces of information on the commodity 42 may include at least one of a commodity name, a brand name, a manufacturer name, a store name, a sales floor, a sales area, and the commodity shelving unit 40.

The feature information on the image area, for example, may be information on the feature amount that is extracted, and includes at least one piece of information indicating whether part or the whole of the marker 50 is detected and information indicating which part of the marker 50 is detected. Here, in a case where part of the marker 50 is detected, a situation is assumed where the remaining part of the marker 50 is not included in an image, for example, because a commodity 42 remains and thus, the remaining part of the marker 50 is hidden. In a case where the whole of the marker 50 is detected, for example, a situation is assumed where almost all the commodities 42 disappear from the commodity shelving unit 40.

A method of determining whether part or the whole of the marker 50 is detected is considered in various ways, and is described as follows. However, no limitation to the following is imposed. Furthermore, one or more combinations of the followings may be made.

(a1) The feature amount of each feature point within the marker 50 is stored in advance in the feature information on the marker 50, inclusively in association with positional information. Then, from positional information on a feature point that corresponds to the feature amount that is detected, an area in which the detected feature points are included, within the marker 50, can be identified.

(a2) A size (a position) of an area that is occupied by the entire marker 50, within a predetermined image capture range (determined by relative positions of, or a distance between, the image capture camera 10 and an image capture target, or the like) of the image capture camera 10, is stored in advance in the feature information on the marker 50. An area of the detected area of the marker 50 is calculated and is compared with an area of the entire marker 50.

When the result of the detection of the marker 50 satisfies a condition that is determined in advance, the execution unit 104 executes a process that is determined in advance. The process that is determined in advance, which is executed by the execution unit 104 includes a process of transmitting predetermined information to a terminal. The predetermined information includes the alert information.

Moreover, the predetermined information, for example, may include information indicating a likelihood that a large-scale theft will occur, a likelihood that stock-out will occur due to bulk buying or the like, or the like. Moreover, information that can identify a place (a shop, a shelf, or the like) and a point in time where these has occurred may be included.

Moreover, the predetermined information includes information that identifies an image obtained by image-capturing with the image capture camera 10 that corresponds to the detected marker 50. The information that identifies the image, for example, includes at least one of identification information on the image capture camera 10, an image-capture point in time, and a file name of the image data 12.

Furthermore, the image data 12 is configured with a plurality of frames. The information that identifies the image, for example, may further include a frame number at the time when the marker 50 is detected. With this configuration, because the frame at the time when the marker 50 is detected can be identified, a manager can check the image data 12 that precedes the identified frame and the image data 12 that follows the identified frame, and for example, can efficiently check whether or not a suspicious person appears in the image.

In an example of a processing condition 130 that is illustrated in FIG. 7, a condition for detecting the marker 50, and each of a processing in a case where the condition is satisfied (True) and a processing in a case where the condition is not satisfied (False) are illustrated in a manner that is associated with each other.

In this example, a condition for detecting the marker 50 (hereinafter also referred to as the marker (M002)) of a marker ID M002 is set to be a condition that an area (or the feature amount of the feature point) which accounts for a predetermined rate (for example, 80%) or greater of the entire area (or the feature amount of the feature point) of the marker (M002) is recognized by the image recognition processing. That is, in a case where an area (or the feature amount of the feature point) that accounts for more than 20% of the entire area (or the feature amount of the feature point) of the marker (M002) is not recognized by the image recognition processing, it is determined that the detection condition is not satisfied.

Then, in a case where the condition is satisfied (True), notification is performed, and in a case where the condition is not satisfied (False), it is determined that nothing is done.

At this point, for example, a message indicating that the marker 50 is detected is notified. Alternatively, in another example, a name of the commodity 42 that corresponds to the marker 50 or positional information on the commodity shelving unit 40 may be notified in a manner that is included in the message. For example, the message may be displayed on the monitor 24 of the server computer 20, or the message may be transmitted to the cash register 30 and the message may be displayed on the shop-assistant display 32.

Destination information on a transmission destination may be stored in a manner that is associated with the processing condition 130. A configuration may be employed in which a destination changes for each detection condition, and a configuration may be employed in which transmission to a predetermined destination is performed without depending on the detection condition.

The processing condition 130 may be stored in a predetermined storage unit (not illustrated) and with reference to the storage unit at the time of the image recognition processing the determination processing may be performed. The determination processing according to the processing condition 130 may be included into a program.

The processing condition 130 may be determined for every marker 50, may be determined for every type of the marker 50, may be determined for every installation place of the marker 50, and may be determined according to a combination of the type of marker 50 and the installation place. The same processing condition 130 may be determined for different types or different installation places.

The processing condition 130 will be described in more detail in the example embodiments that will be described below.

A computer program that realizes the information processing apparatus 100 which is configured in this manner will be described below.

The CPU 82 of the computer 80 in FIG. 4 reads the program 90, which is stored in the storage 85, into the memory 84 for execution, and thus can realize each of the functions of the information processing apparatus 100 according to the present example embodiment.

A computer program 90 according to the example embodiment of the present invention is written in such a manner that the computer 80 for realizing the information processing apparatus 100 is caused to perform a procedure for detecting the maker 50 that is determined in advance, which is different from the commodity 42, by the image recognition processing on the image obtained by image-capturing the place (the commodity shelving unit 40) where the commodity 42 is installed, and a procedure for performing a predetermined process, when the result of the detection of the marker 50 satisfies the condition that is determined in advance.

The computer program 90 according to the present example embodiment may be stored in a storage medium that is readable with the computer 80. The storage medium is not particularly limited and storage medium in various forms are considered. Furthermore, the program 90 may be loaded from the storage medium into the memory 84 of the computer 80, may be downloaded on the computer 80 through a network, and may be loaded into the memory 84.

The media, on which the computer program 90 is stored, include a non-transitory tangible medium that is usable by the computer 80, and the program code that is readable by the computer 80 is embedded in the medium. When the computer program 90 is executed on the computer 80, the computer 80 is caused to perform the following information processing method that realizes the information processing apparatus 100.

The information processing method of the information processing apparatus 100 according to the present example embodiment, which is configured in this manner, will be described below.

Figure 8:
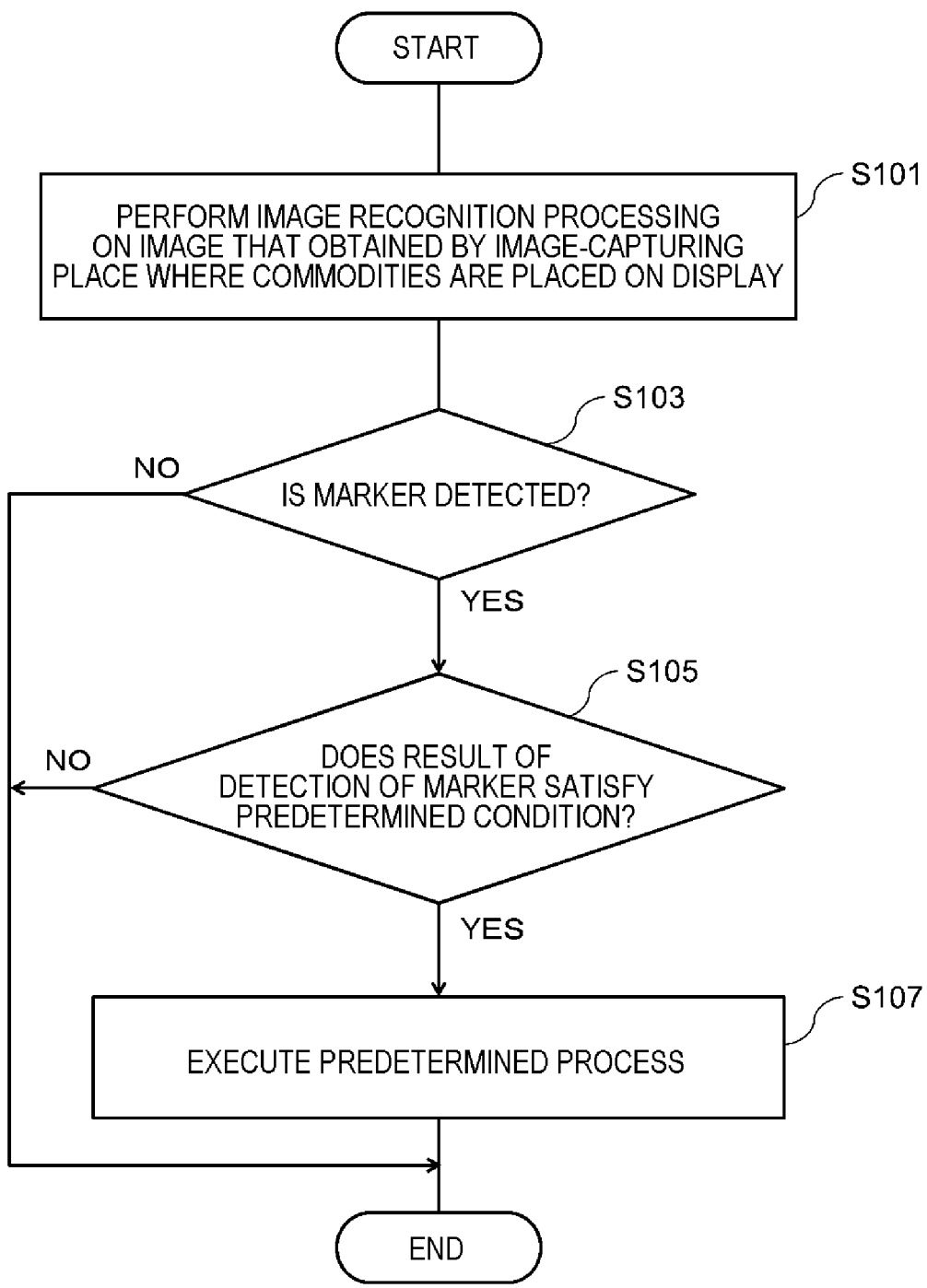
FIG. 8 is a flowchart illustrating an example of operation of the information processing apparatus according to the present example embodiment.

FIG. 8 is a flowchart illustrating an example of operation of the information processing apparatus 100 according to the present example embodiment.

An information processing method according to the example embodiment of the present invention is an information processing method of the information processing apparatus 100, and is an information processing method that is performed by the computer 80 which realizes the information processing apparatus 100.

The information processing method according to the present example embodiment includes detecting of the pre-determine marker 50 by the information processing apparatus 100 performing the image recognition processing on the image obtained by image-capturing the place where the commodity 42 is placed (Step S103), and performing the predetermined process, when the result of the detection of the marker 50 satisfies the condition that is determined in advance (Step S107).

For more detail, the detection unit 102 performs the image recognition processing on a certain frame or each frame of the image data 12, and extracts a feature (Step S101). Then, the detection unit 102 detects an image area that has a degree of similarity equal to or more than a threshold to a feature of the marker 50 which is registered in advance, as an image area of the marker 50 (YES in Step S103).

At this time, the detection unit 102 stores the marker ID of the marker 50 and the detection date and time in the detection result storage unit 120, in association with each other. Moreover, information on a detection place (for example, the commodity shelving unit 40, the shelf, a position within the shelf, a position within the captured image, or the like) where the marker 50 is detected, and the identification information on the image capture camera 10 may be included.

For example, as illustrated in FIG. 3A, the marker 50 is installed in a predetermined position on the commodity shelving unit 40. As illustrated in FIG. 3B, in a case where a plurality of commodities 42 are placed on the commodity shelving unit 40, because the marker 50 is hidden by the commodities 42, the marker 50 is not detected from the image data 12 (NO in Step S103). In this case, Step S105 and Step S107 are bypassed, and the present processing is ended without anything being done.

Furthermore, as illustrated in FIG. 3B, a position in which the commodity 42 has to be positioned and a relative position of the marker 50 may be determined in advance and may be stored in the marker positional-information storage unit 114. When this is done, from an area of the marker 50 in view, it can be determined from which position the commodity 42 disappears, in which position the commodity remains, what percentage of all the commodities 42 disappear or remain, or the like.

Figure 9:
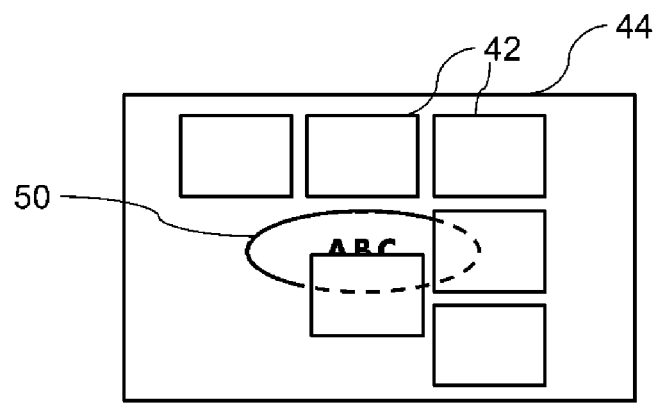
FIG. 9 is a diagram for describing marker detection processing by the information processing apparatus according to the present example embodiment.

On the other hand, as illustrated in FIG. 3C, in a case where at least some of the commodities 42 disappear from the commodity shelving unit 40, because at least a part of the marker 50 that is installed on the commodity shelving unit 40 appears (In FIG. 3C, almost all the commodities 42 disappear and the entire marker 50 appears), the marker 50 is detected from the image data 12 (YES in Step S103). For example, in FIG. 3C, almost all commodities 42 disappear from the commodity shelving unit 40. Furthermore, as illustrated in FIG. 9, in a case where only some of the commodities 42 disappear from the commodity shelving unit 40, because only a part of the marker 50 appears, a part of the marker 50 is detected from the image data 12 (YES in Step S103).

Then, the execution unit 104 determines whether or not the result of the detection of the marker 50 satisfies a condition that is determined in advance (Step S105). For example, in a case where a condition that is described in the processing condition 130 in FIG. 7, that is, a condition that a detected a part accounts for a predetermined rate (for example 80%) or greater of the maker (M002) is set and this condition is satisfied (True), the execution unit 104 notifies a destination that is determined in advance (here, the cash register 30) of a predetermined message (Step S107).

In the present example embodiment, the predetermined message includes the information that the marker (M002) is detected. Alternatively, the predetermined message may include a name of the commodity 42 that corresponds to the marker (M002) or positional information (a floor, a sales area, number of the commodity shelving unit 40, or the like) on the place where the commodity 42 is placed. Moreover, the predetermined message may include the information that unknown loss of the commodity 42 occurs. At least one of these or a combination of these may be included. The predetermined message may include information such as an occurrence point in time of the unknown loss.

For example, in the cash register 30, a message is received from the information processing apparatus 100 (the server computer 20), and the received message is displayed on the shop-assistant display 32. Accordingly, the shop assistant Ua can know that the maker (M002) is detected (that the known loss occurs, or a place where the known loss occurs).

Furthermore, in a case where the marker (M002) is detected (True), the execution unit 104 may store the marker ID (M002) of the marker 50 that is detected and the detection date and time information in the detection result storage unit 120. Moreover, in a case where the marker (M002) is not detected (False), the information that the marker 50 is not detected may be stored in the detection result storage unit 120 in association with the date and time information. The storing of the information of the non-detection of the marker 50 may be performed for a predetermined duration (for example, 30 minutes or the like).

Furthermore, as illustrated in FIG. 9, in the case where only some of the commodities 42 disappear from the commodity shelving unit 40, because only a part of the marker 50 appears, the part of the marker 50 is recognized by the image recognition processing from the image data 12. At this point, for example, approximately 60% of the marker 50 is assumed to be recognized. Therefore (due to the recognition ratio of below 80%), the execution unit 104 determines that the marker (M002) is not detected (NO in Step S105) and bypasses Step S107 and ends the present processing without anything being done.

At this time, the execution unit 104 may further store the marker ID (M002) of the recognized marker 50, the date and time information, and the information that approximately 60% of the marker 50 is recognized, in the detection result storage unit 120 in association with each other.

As described above, in the information processing apparatus 100 according to the present example embodiment, the marker 50 that is determined in advance is detected by the detection unit 102, by performing the image recognition processing on the image obtained by image-capturing the place where the commodity 42 is placed, and when the result of the detection of the marker 50 satisfies the condition that is determined in advance, a process that is determined in advance is executed by the execution unit 104.

In this manner, in the information processing apparatus 100 according to the present example embodiment, the marker 50 that is determined in advance is installed on the place (the commodity shelving unit 40) on which the commodity 42 is placed, the image recognition processing is performed on the image obtained by image-capturing the place, and the marker 50 is detected. Only by doing this, an effect is achieved in which the unknown loss, such as the disappearance of a large number of commodities 42, can be simply detected and can be notified.

A difference between time-series changes in the image data 12 obtained by image-capturing the commodity shelving unit 40 can be detected and the disappearance of the commodity 42 from the commodity shelving unit 40 can be detected, but in such a case, there is a problem in that load on image processing is raised. In the information processing apparatus 100 according to the present example embodiment, because only with the result of the detection of the marker 50, the unknown loss can be detected to be notified, the load on the image processing is lowered. Thus, the efficiency is increased and the cost relating to the image processing is also suppressed to a low level.

Second Example Embodiment

Next, an information processing apparatus 200 according to a second example embodiment of the present invention will be described.

Figure 10:
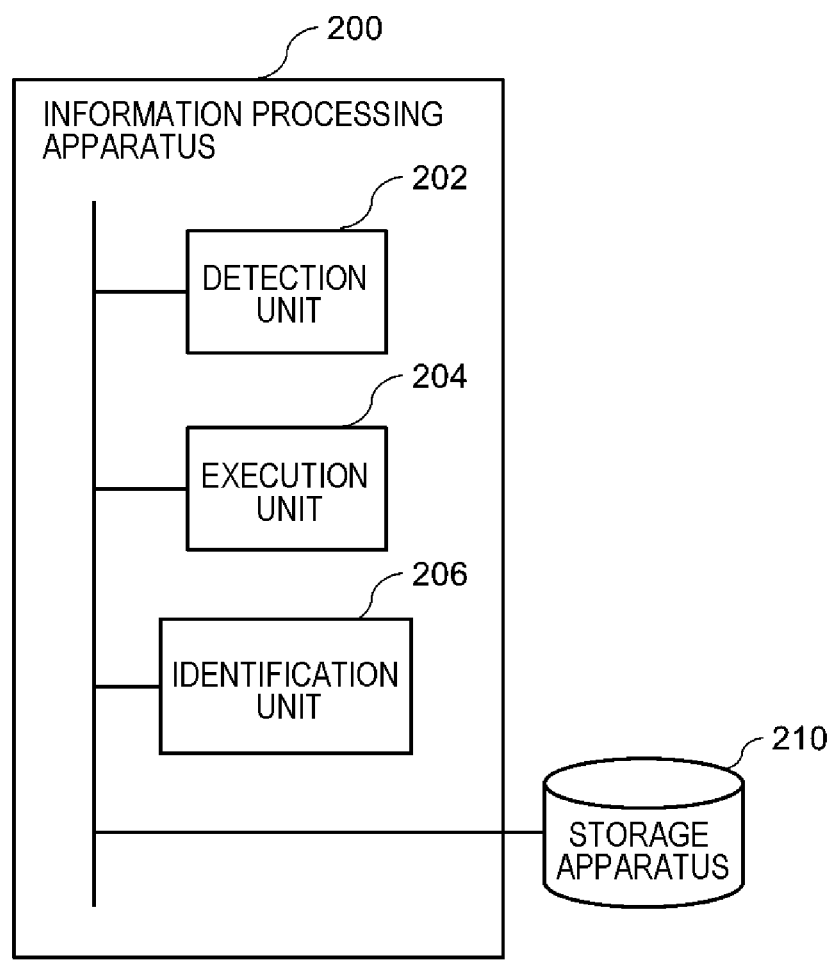
FIG. 10 is a functional block diagram illustrating a logical configuration of the information processing apparatus according to the example embodiment of the present invention.

FIG. 10 is a functional block diagram illustrating a logical configuration of the information processing apparatus 200 according to the second example embodiment of the present invention.

The information processing apparatus 200 according to the present example embodiment includes a detection unit 202, an execution unit 204, and an identification unit 206. The detection unit 202 and the execution unit 204 have functions similar to those of the detection unit 102 and the execution unit 104, respectively, of the information processing apparatus 100 in FIG. 1 and, along with this, have functions that will be described below.

Note that a configuration of the information processing apparatus 200 according to the present example embodiment can be combined with a constitution of an information processing apparatus according to another example embodiment, which will be described below.

The information processing apparatus 200 is connected to a storage apparatus 210 in an accessible manner. The storage apparatus 210 includes a storage unit similar to the storage apparatus 110 according to the example embodiment, which is described above. The storage apparatus 210, for example, is a hard disk, a Solid State Drive (SSD), a memory card, or the like, and may be included in the information processing apparatus 200 and may be an external apparatus.

In the information processing apparatus 200 according to the present example embodiment, a plurality of markers 50 are set to be on the place where the commodity 42 is placed.

The identification unit 206 identifies a type of, or a place of, the marker 50 that is detected by the detection unit 202.

The execution unit 204 executes a process in accordance with the identified type of, or the identified place of, the marker 50.

Furthermore, the execution unit 204 may perform processing in accordance with the combination of the detected markers 50.

Types of markers 50 are considered in various ways, such as is the case when a distinct by a common feature or quality is made, when a common property is shared, and when a difference is recognized. A type that is identified may be registered in advance. It may be identified which one is a corresponding type. The identification unit 206 may divide types according to features of a plurality of detected markers 50. For example, in a case where there are a red marker 50 in the shape of a circle, a black marker 50 in the shape of a quadrangle, and a blue marker 50 of a logotype, the markers 50 may be divided by a figure (a figure such as a circle or quadrangle, and a logotype) into two types, and may be divided by a tone of color, for example, into two types, color, and black and white.

A place of the marker 50 is identified by the positional information on the marker 50 described above. For example, the place of the marker 50 can be identified by the store floor, the area, the commodity shelving unit 40, the position of the shelf, the position on the shelf, the position of the image capture camera 10, the image capture range of the image capture camera 10, or the like. Moreover, in a case where a plurality of makers 50 are included in the image capture range of the image capture camera 10, the place of the maker 50 may be identified by information including positional information relative to any other marker 50 or to a position that is a predetermined reference.

An example in which processing varies according to a type of the marker 50 will be described below with reference to FIGS. 11 and 12.

Figure 11A:
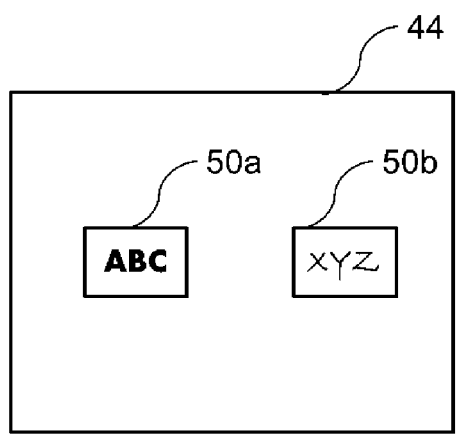
FIGS. 11A-11C are diagrams for describing the marker detection processing by the information processing apparatus according to the present example embodiment.

FIG. 11A illustrates a scene in which two types, a marker 50*a* and a marker 50*b* are pasted on the shelf plate 44. The marker 50*a* is made by printing a logotype of a brand ABC. The marker 50*b* is made by printing a logotype of a brand XYZ.

A marker ID of the marker 50*a* is assumed to be M004, and a marker ID of the marker 50*b* is assumed to be M006.

Figure 11B:
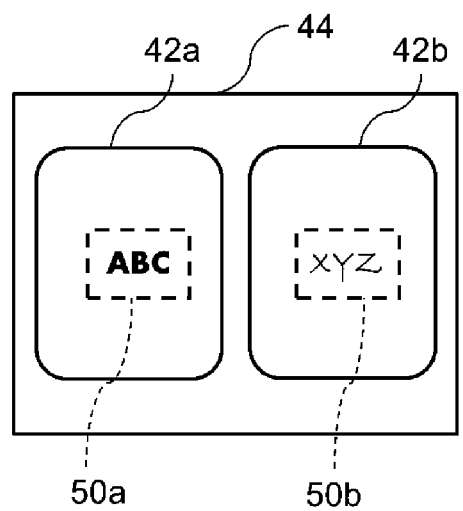

At places where respective markers 50 are pasted on the shelf plate 44, clothes with a brand that corresponds to each logotype are assumed to be stacked on top of one another. In FIG. 11B, commodities 42a that are clothes with the brand ABC are assumed to be stacked on top of one another on the marker 50a, and commodities 42b that are clothes with the brand XYZ are assumed to be stacked on top of one another on the marker 50b.

In FIG. 11B, because each commodity 42 is placed on each marker 50, each commodity 42 is captured in the image data 12, and the marker 50 is not captured (the marker 50 is indicated by a broken line). Consequently, the detection unit 102 does not detect any marker 50.

Figure 11C:
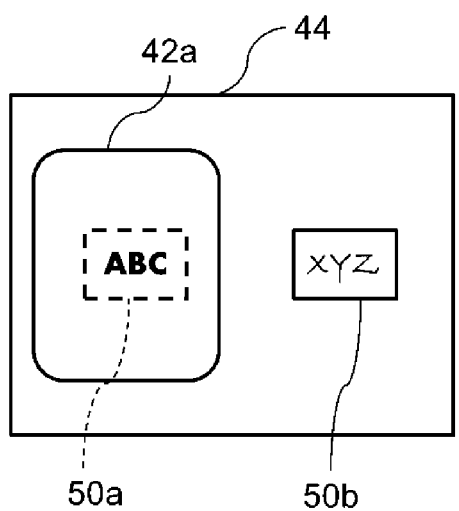

In FIG. 11C, a scene in which only the commodity 42a with the brand ABC remains on the shelf plate 44 and the commodity 42b with the brand XYZ disappears is illustrated. The commodity 42a and the marker 50b are captured in the image data 12, and the marker 50a is not captured (the marker 50a is indicated by a broken line). Consequently, the detection unit 102 detects only the marker 50b, and does not detect the marker 50a.

Figure 12:
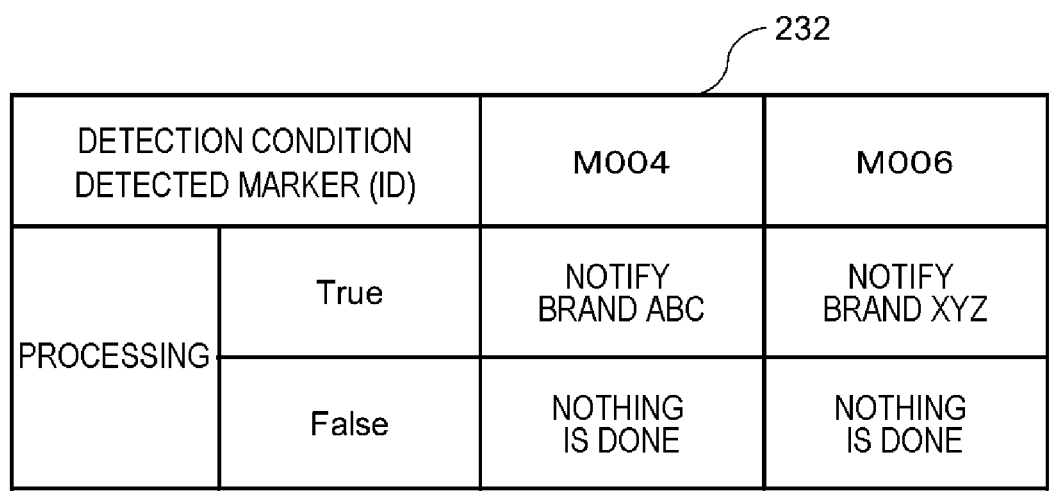
FIG. 12 is a diagram illustrating an example of a condition for processing by the information processing apparatus according to the present example embodiment.

FIG. 12 is a diagram illustrating an example of a processing condition 232 of the information processing apparatus 200 according to the present example embodiment.

As described in the processing condition 232, in this example, a brand name that corresponds to the marker 50 is notified according to the type (here, the marker ID) of the marker 50 that is detected from the image data 12, in a manner that is included in the message. Accordingly, which brand the commodity 42 of which the unknown loss occurs has can be simply notified.

In an example of a modification to this example, for example, if a barcode in which commodity information is stored is used as the marker 50, a configuration can be employed in which when the marker 50 is detected, the barcode is read and decrypted and the commodity information is notified.

Furthermore, in the present example embodiment, the identification unit 206 may identify a range which corresponds to the detected part of the marker 50. The execution unit 204 may perform a process in accordance with the range that is identified by the identification unit 206.

Figure 13A:
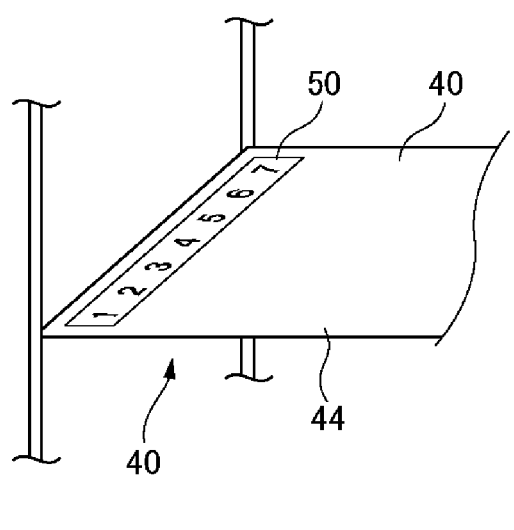
FIGS. 13A-13B are diagrams illustrating an example of marker installation for the information processing apparatus according to the present example embodiment.

In the present example embodiment, as illustrated in FIG. 13A, consecutive numeral symbols 1 to 7 are included in predetermined positions of the marker 50, and thus, based on the numeral symbols that are recognized by the detection unit 102, a range corresponding to the numeral symbols can be identified as the detected range.

In an example in FIG. 13A, the numeral symbol 1 corresponds to the foremost position on the shelf plate 44. The greater numeral, the more backward the position corresponding to the numeral symbol is located toward the rear of the shelf plate 44. The numeral symbol 7 corresponds to the rearmost position on the shelf plate 44. Here, the range that is recognized within the marker 50 and identified corresponds to a range in which the commodity 42 disappears.

Figure 13B:
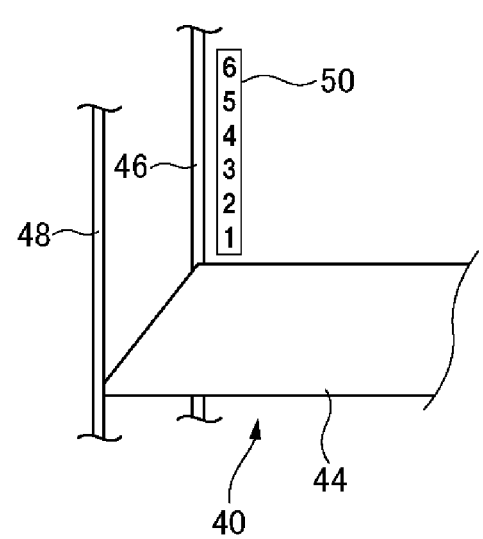

In an example in FIG. 13B, the marker 50 that includes the consecutive numeral symbols 1 to 6 in predetermined positions are pasted on a rear surface plate 46 of the commodity shelving unit 40. The numeral symbol 1 corresponds to a position that is closest to the shelf plate 44. The greater numeral, the more upward the position corresponding to the numeral symbol is located in the height direction from the shelf plate 44. The numeral symbol 6 corresponds to the uppermost position from the shelf plate 44. Here, the range that is recognized within the marker 50 and identified, corresponds to a range in which the commodities 42 that are stacked on top of one another on the shelf plate 44 disappear.

In an example in FIG. 13A, the image capture camera 10 is installed in a position in the upward direction, which faces an upper surface of the shelf plate 44 of the commodity shelving unit 40 on which the marker 50 is installed, and performs image capture toward the direction of the shelf plate 44 of the commodity shelving unit 40.

In an example in FIG. 13B, the image capture camera 10 is installed in a position in the horizontal direction, which faces a surface of the rear surface plate 46 of the commodity shelving unit 40 on which the marker 50 is installed, and performs the image capture toward the direction of the rear surface plate 46 of the commodity shelving unit 40.

The execution unit 204 may change processing according to a range of the marker 50 that is identified in this manner. In the present example embodiment, processing that corresponds to the numeral indicating a detected range of the marker 50 is defined in advance by a processing condition 230 that will be described below.

Figure 14A:
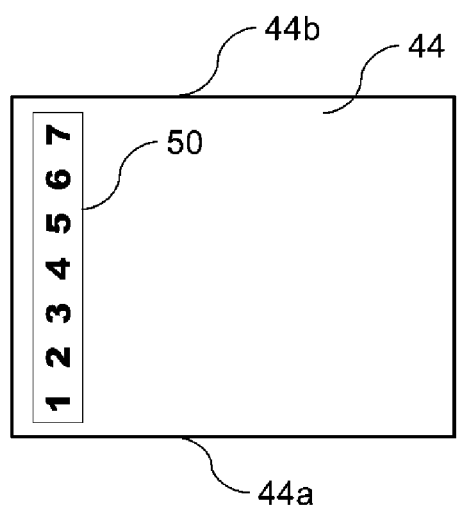
FIGS. 14A-14D are diagrams for describing the marker detection processing by the information processing apparatus according to the present example embodiment.

FIG. 14A is a diagram of the shelf plate 44 in FIG. 13A, when viewed from above.

Figure 14B:
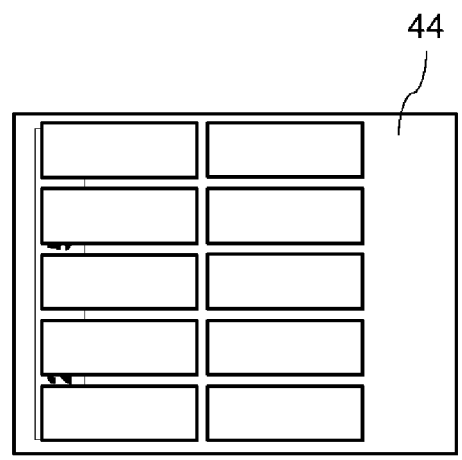

FIG. 14B illustrates a scene in which many commodities 42 are on display on the commodity shelving unit 40. In this manner, in a case where many commodities 42 are on display on the shelf plate 44 of the commodity shelving unit 40, almost the entire marker 50 is hidden by the commodities 42. Consequently, the detection unit 102 does not recognize the marker 50 by the image recognition processing.

Figure 14C:
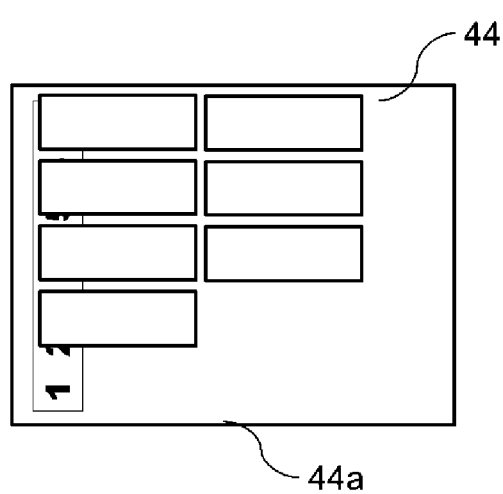

FIG. 14C illustrates a scene in which several of commodities 42 disappear and thus a part of the marker 50 appears. At this point, among the numeral symbols 1 to 7 on the marker 50, only 1 comes into view. Consequently, the detection unit 102 recognizes the numeral 1 on the marker 50 by the image recognition processing. The identification unit 206 identifies the range of the marker 50 as a 0-to-1 range of the near side 44a of the shelf plate 44.

Figure 14D:
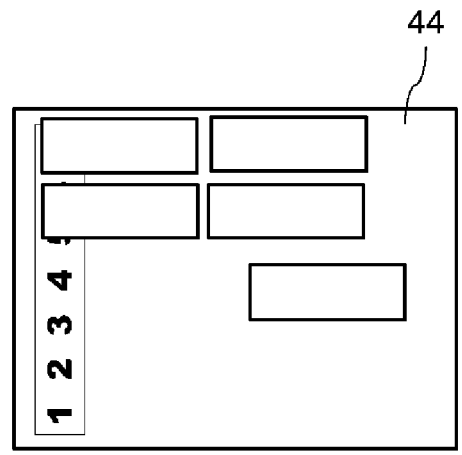

FIG. 14D illustrates a scene in which approximately half of the commodities 42 disappear and thus half of the marker 50 appears. At this point, among the numeral symbols 1 to 7 on the marker 50, the numeral 1 to 4 come into view. Consequently, the detection unit 102 recognizes the numerals 1 to 4 on the marker 50. The identification unit 206 identifies a 2-to-5 range of the marker 50 as a range from the near side 44a to the middle of the shelf plate 44.

In this manner, with the range where a plurality of numeral symbols of the marker 50 (at this point, each numeral within the marker 50 also serves as positional information) that are arranged toward the depth direction of the shelf plate 44 of the commodity shelving unit 40 come into view, approximate numerical quantity of commodities 42 that disappear can be estimated. For example, in a case where the numerals of up to 7 on the marker 50 are recognized, a state can be estimated where many commodities 42 disappear.

FIG. 15 is a diagram illustrating an example of the condition 230 for processing by the information processing apparatus 200 according to the present example embodiment.

As described in the processing condition 230, in the present example embodiment, from the result of the detection of the marker (M003) in FIG. 14A, for example, depending the visibility (which corresponds to the detected ranges of the maker 50) of the numeral symbols 1 to 7 that are written on the marker (M003), an alarm level at which notification is performed is caused to change. That is, processing is changed according to the detected range of the detected marker 50. In the processing condition 230, each range to which a maximum value (for example, in a case where the numerals 1 to 5 come into view, a maximum value is 5) among the numerals that are detected is assigned is defined as the detected range.

For example, in a case where no numeral symbols on the maker come into view (0) or in a case where the numeral symbol 1 comes into view (is recognized by the detection unit 102), an alarm is set to a level 1. It is assumed that the greater numeral, the higher a warning level. Then, in a case where any one of the numerals 2 to 5 on the marker comes into view (is recognized by the detection unit 102), the alarm level is set to 2. Moreover, in a case where at least one of the numerals 6 and 7 on the marker comes into view (is recognized by the detection unit 102), the alarm level is set to 3. In this example, the execution unit 104 outputs the alarm level that is set in a case where the result of the detection satisfied a condition, as a message.

That is, in a case shown in FIG. 14B where no numerals on the marker are detected from the image data 12, an alarm level 1 that corresponds to the 0-to-1 detected range is set and the message is output.

That is, in a case shown in FIG. 14C where the numeral 1 on the marker is detected from the image data 12, the alarm level 1 is set, and the message is output.

In a case shown in FIG. 14D where the numerals 1 to 4 on the marker are detected from the image data 12, an alarm level 2 that corresponds to the 2-to-5 detected range, in which the maximum value 4 is included is set, and the message is output.

In a case shown in FIG. 14A where the numerals 1 to 7 on the marker are detected from the image data 12, an alarm level 3 that corresponds to a 6-to-7 detected range, in which the maximum value 7 is included is set, and the message is output.

Furthermore, a destination to which the message is transmitted may be changed according to the alarm level. The destination information is separately stored in advance in a destination table (not illustrated) in an associated manner. Then, the execution unit 204 may acquire the destination information that corresponds to the alarm level, from the destination table, and may transmit the acquired destination information.

The detection unit 202 according to the present example embodiment has a function similar to that of the information processing apparatus 100 according to the example embodiment in FIG. 1, which is described above, and, along with this, detects the marker 50 using the feature of the marker 50 that is learnt by machine learning.

The machine learning, for example, can be realized by a machine learning-type detection engine.

The feature of the marker 50 from the image data on the marker 50 is learnt by the machine learning-type detection engine, and the feature is registered in a leaning library (equivalent to the marker information storage unit 112). Moreover, the marker 50 that is learnt is registered in the marker positional-information storage unit 114 in a manner that is associated with information on the installation place of the marker 50. Furthermore, the information on the installation place (an image or information that can identify a place is used) may also be learnt by the machine learning, and may be registered in the learning library (equivalent to the marker positional-information storage unit 114).

For example, states in FIGS. 14A to 14D may be individually learnt by the machine learning, shapes or visibilities (partial, whole, or the position or the like) of the marker (M002) may be divided according to cases, a result of the division may be presented to the manager, and the manager may register the processing condition 230 in an associated manner. Moreover, the marker 50 (for example, the barcode) or the like that indicates positional information (information that identifies a floor, a shop, and a shelf of the commodity shelving unit 40) on the shelf plate 44 is further installed on the shelf plate 44, and is image-captured by the image capture camera 10 together with the marker (M002). Thus, the positional information is acquired from the barcode, and may be stored, as learnt positional information on the maker (M002), in the marker information storage unit 112 in an automatically associated manner.

A computer program for the information processing apparatus 200 according to the present example embodiment, which is configured in this manner, will be described below.

The computer program according to the present example embodiment is written in such a manner that the computer 80 for realizing the information processing apparatus 200 is caused to execute a procedure for identifying the type of, or the place of, the detected marker 50 and a procedure for performing processing in accordance with the identified type of, or the identified place of, the marker 50.

The information processing method of the information processing apparatus 200 according to the present example embodiment, which is configured in this manner, will be described below.

Figure 16:
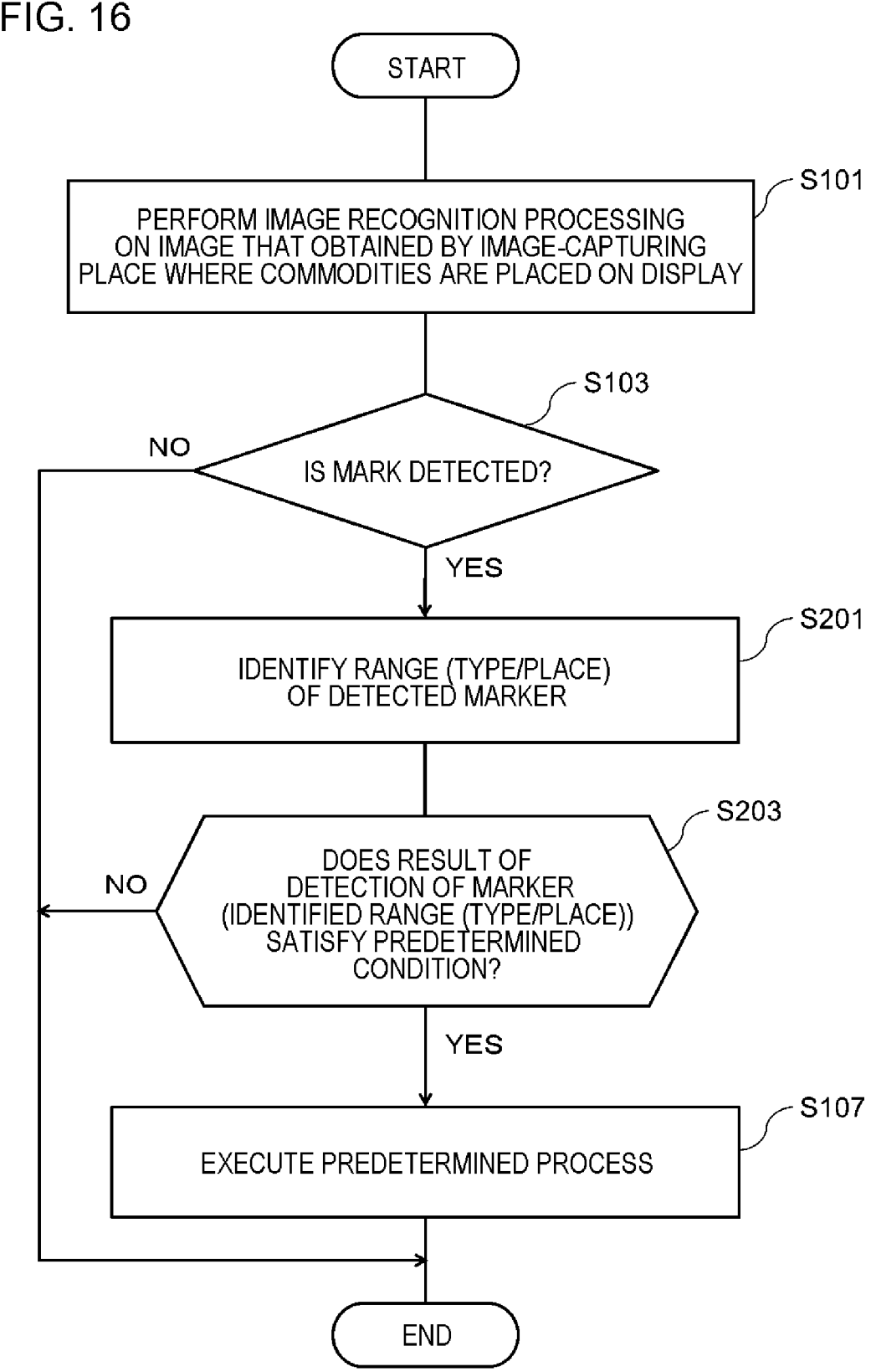
FIG. 16 is a flowchart illustrating an example of operation of the information processing apparatus according to the present example embodiment.

FIG. 16 is a flowchart illustrating an example of operation of the information processing apparatus 200 according to the present example embodiment.

The flowchart in the information processing apparatus 200 according to the present example embodiment includes a procedure (Step S101, Step S103, and Step S107) similar to those in the flowchart in the information processing apparatus 100 in FIG. 8 according to the example embodiment, which is described above, and further includes Step S201 and Step S203.

An information processing method according to the example embodiment of the present invention is an information processing method of the information processing apparatus 200, and is an information processing method that is performed by the computer 80 which realizes the information processing apparatus 200.

The information processing method according to the present example embodiment includes the information processing apparatus 200's identifying the type of, or the place of (or the range), the detected marker 50 (Step S201), and the information processing apparatus 200's executing the process in accordance with the identified type, or the identified place of, the marker 50 (Step S107).

An example in which processing varies according to a range of the marker will be described in detail below with reference to FIGS. 14 to 16.

As described with reference to FIG. 8, in Step S103, the detection unit 202 detects an image area that has a degree of similarity equal to or more than a threshold to a feature of the marker 50 which is registered in advance, as an image area of the marker 50 (YES in Step S103).

Moreover, the identification unit 206 identifies the range of the marker 50 that is detected (Step S201). Here, numerals within the marker 50 are recognized by the image recognition processing. For example, in the case of FIG. 14D, the numerals 1 to 4 are identified.

Then, the execution unit 204 refers to the processing condition 230, and because the identified range satisfies the condition 2-to-5 (YES in Step S203), the execution unit 204 executes setting to the alarm level 2, as the corresponding process, and executes a process of notifying a message of a predetermined terminal (Step S107).

Furthermore, in the case of FIG. 14C, in Step S201, the identification unit 206 identifies the numeral 1 as the range of the marker 50. Then, because the processing condition 230 is referred to and the identified range satisfies the condition 0-to-1 (YES in Step S203), the execution unit 204 executes setting to the alarm level 1, as the corresponding process, and executes a process of notifying a message of a predetermined terminal (Step S107).

Moreover, in the case of FIG. 14A, in Step S201, the identification unit 206 identifies the numerals 1 to 7 as the range of the marker 50. Then, the execution unit 204 refers to the processing condition 230, and because the identified range satisfies the condition 6-to-7 (YES in Step S203), the execution unit executes setting to the alarm level 3, as the corresponding process, and executes a process of notifying a message of a predetermined terminal (Step S107).

In this manner, according to the present example embodiment, a process that is determined in advance can be performed according to at least one of the range, the type, and the place of the marker 50. As illustrated in FIG. 14C, in a case where a small number of commodities 42 disappear, the alarm level 1 is notified. As illustrated in FIG. 14D, in a case where half of the commodities 42 disappear, the alarm level 2 is notified. As illustrated in FIG. 14A, in a case where all of the commodities 42 disappear, the alarm level 3 is notified.

As described above, in the information processing apparatus 200 according to the present example embodiment, at least one of the type, the place, and the range of the marker 50 that is detected by the identification unit 206 is identified, and processing is performed according to at least one of the type, the place, and the range, which are identified, and a combination of these. With this configuration, the same effect as in the example embodiments described above, and, along with this, various types of processing are possibly performed in an associated manner according to the type, the place, and the range of the marker 50.

Third Example Embodiment

Next, an information processing apparatus 300 according to a third example embodiment of the present invention will be described.

Figure 17:
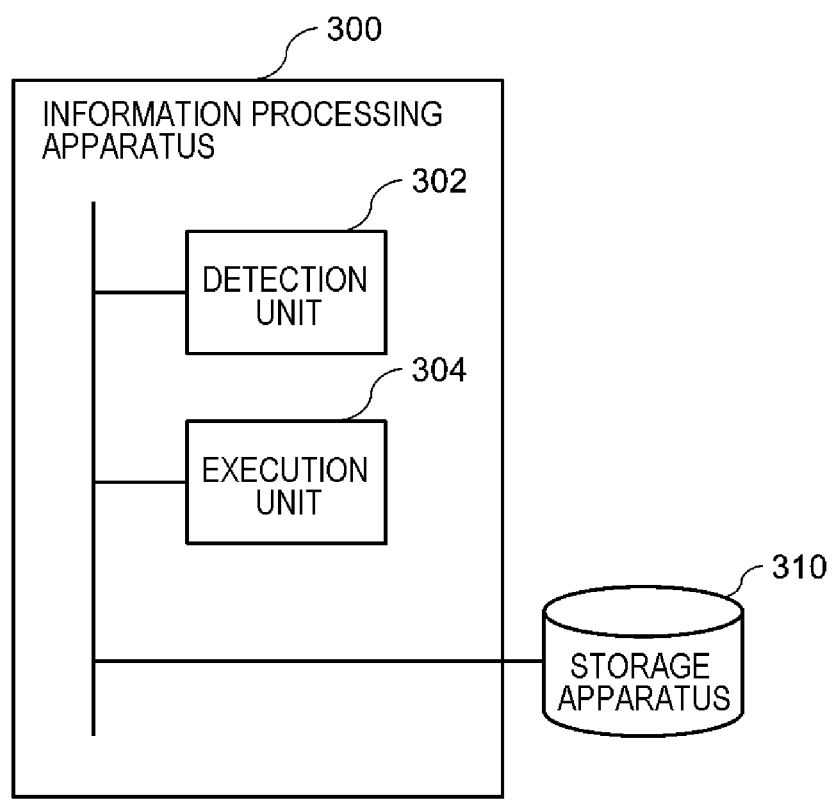
FIG. 17 is a functional block diagram illustrating a logical configuration of an information processing apparatus according to an example embodiment of the present invention.

FIG. 17 is a functional block diagram illustrating a logical configuration of the information processing apparatus 300 according to the third example embodiment of the present invention.

The information processing apparatus 300 according to the present example embodiment is different from the example embodiments described above in that the result of the detection of the marker 50 is stored in a time-series manner and in that processing is changed according to a difference between the previously detected marker 50 and the currently detected marker 50.

The information processing apparatus 300 is further connected to the storage apparatus 310 in an accessible manner. The storage apparatus 310 includes a storage unit similar to at least one of the storage apparatus 110 and the storage apparatus 210 according to the example embodiments described above. The storage apparatus 310, for example, is a hard disk, a Solid State Drive (SSD), a memory card, or the like, and may be included in the information processing apparatus 300 and may be an external apparatus.

A configuration of the information processing apparatus 300 according to the present example embodiment can be suitably combined with the configurations of the information processing apparatus according to the other example embodiments of the present invention, within a range where there is no contradiction.

The information processing apparatus 300 according to the present example embodiment includes a detection unit 302 and an execution unit 304. The information processing apparatus 300 may further include configuration similar to that of the information processing apparatus 200 in FIG. 10 according to the example embodiment, which is described above.

The detection unit 302 has a function similar to that of the detection unit 102 according to the example embodiment described above, stores the result of the detection of the detected marker 50 in a time-series manner in the storage apparatus 310, and obtains the difference between the previously detected marker 50 and the currently detected marker 50.

The execution unit 304 executes a process in accordance with the difference between the markers 50 that are detected by the detection unit 302.

In the present example embodiment, the detection unit 302 is assumed to perform detection processing of the marker 50 with a predetermined period, and for example, all results of the detection may be stored. Alternatively, a configuration may be employed in which only in a case where a change in the feature amount equal to or more than a threshold from the result of the previous detection is detected, the result of the detection is stored.

In the present example embodiment, the latter case is employed. That is, only in the case where the change in the feature amount equal to or more than the threshold from the result of the previous detection is detected, the result of the detection is stored.

In the present example embodiment, the terms "previous" and "current" refer to the results of the detection at two points in time, between which there is a predetermined duration. The term "previous" is assumed to refer to earlier (older) information than the term "current." The term "current" may not refer to the present time, and may refer to a certain point in the past (in history information).

The difference that is detected by the detection unit 302 is considered in various ways, and examples thereof are given as follows. However, no limitation to these is imposed. Furthermore, the followings can be combined.

(b1) Difference between areas of the marker area that is detected (b2) Difference between the numbers of predetermined objects (for example, letters, marks, or the like) that are included in the marker that is detected (b3) Difference between maximum values or minimum values (or ranges of) among predetermined numerals that are included in the marker that is detected (b4) Difference between the numbers of types of the marker that is detected A timing at which the difference is obtained is considered in various ways, examples thereof are given as follows. However, no limitation to these is imposed. Furthermore, the followings can be combined.

(c1) Every period of the detection processing (c2) Whenever the result of the detection is stored (c3) Every predetermined time (every five minutes or the like), every point in time (every hour or the like), or the like At this point, the examples (b3) and (c2), which are described above, will be described below.

As illustrated in FIG. 13B, in the present example embodiment, the marker 50 in which the numerals 1 to 6 are lined up from downward to upward is installed on the rear surface plate 46 of the commodity shelving unit 40.

FIG. 19 is a diagram illustrating an example of data structure of a detection result storage unit 320 according to the present example embodiment.

In this example, the result of the detection for every shelf plate 44 of the commodity shelving unit 40 is stored, but no limitation to this is imposed. The result of the detection of the marker 50 on the shelf plate 44 (T1001) is stored in a detection result storage unit 320a.

In FIG. 19, a maximum value (or a minimum value) among the numerals on the marker detected by the detection unit 302, along with the detection date and time information, is stored in the detection result storage unit 320a or a detection result storage unit 320b for every shelf plate 44.

Figure 18A:
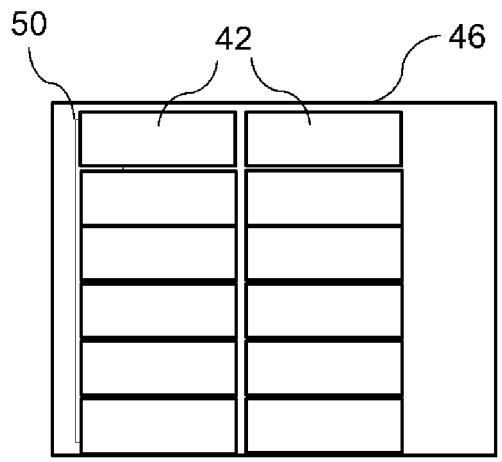
FIGS. 18A-18D are diagrams for describing the marker detection processing by the information processing apparatus according to the present example embodiment.

As illustrated in FIG. 18A, in a case where the commodities 42 fully occupy the commodity shelving unit 40, the marker 50 is hidden by the commodities 42 from view. The maker 50 is almost not captured into the image data 12 obtained by image-capturing with the image capture camera 10. Consequently, the detection unit 302 does not detect the marker 50 from the image data 12. In a case where nothing is detected, the numeral 0 is stored in the detection result storage unit 320a (FIG. 19A) of the detection result storage unit 320 in a manner that is associated with point-in-time information. Furthermore, in other example embodiments, a configuration may be employed in which nothing is stored in the detection result storage unit 320.

Figure 18B:
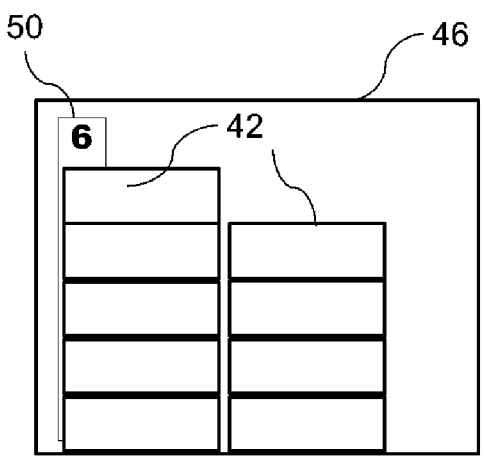
Figure 18C:
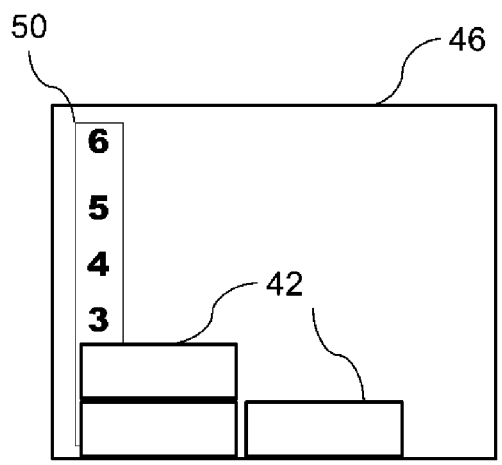

Next, as illustrated in FIG. 18B, when several commodities 42 disappear, a part of an upper part of the marker 50 comes into view. A part of the marker 50, the numeral 6 is captured into the image data 12 obtained by image-capturing with the image capture camera 10. Consequently, the detection unit 302 detects a part of the marker 50 from the image data 12 and recognizes the numeral 6.

Then, the detection unit 302 stores the numeral 6 in the detection result storage unit 320a (FIG. 19A) in a manner that is associated with the detection date and time information. In the present example embodiment, a minimum value of the recognized numeral is stored in the result of the detection. Depending on the order of numerals that are written on the marker 50 and a way of placing the commodities 42 on display, it can be determined which one of a minimum value and a maximum value among numerals, and a range of numerals is stored. In the present example embodiment, as the number of commodities 42 decreases, an appearing numeral becomes gradually smaller from 6 to 1. Because of this, a minimum value of the numerals is used as an index indicating a state where the number of commodities 42 decreases.

On the other hand, in the case of the marker 50 that is illustrated in FIG. 14A, as the number of commodities 42 decreases, an appearing numeral becomes gradually larger from 1 to 7. Because of this, a maximum value of the numerals is used as an index indicating a state where the number of commodities 42 decreases.

Figure 19A:
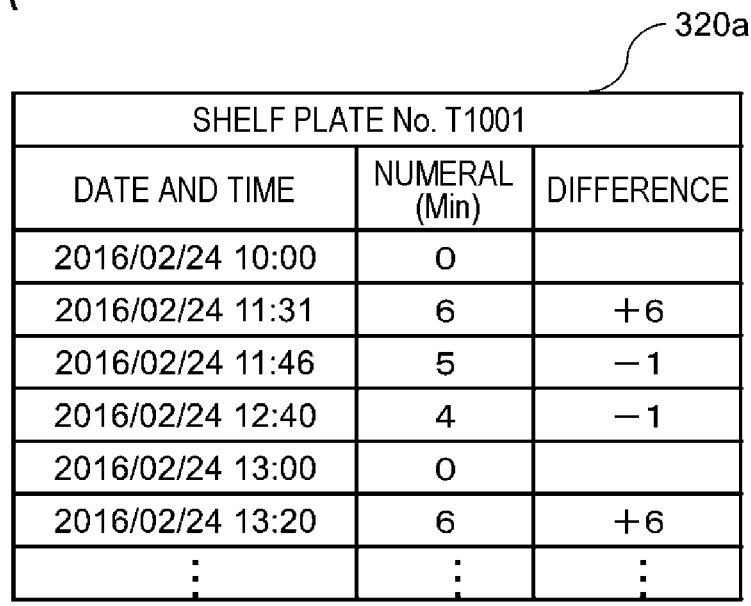
FIGS. 19A-19B are diagrams illustrating an example of a data structure of a detection result storage unit of a storage apparatus that is accessed by the information processing apparatus according to the present example embodiment.

First, normal commodity sales time will be described. In this case, because the number of commodities 42 gradually decreases, the numerals 5 and 4 are sequentially detected with the passage of time, and, as illustrated in FIG. 19A, are stored in the detection result storage unit 320a in a manner that is associated with detection-point-in-time information. Moreover, for example, commodities 42 are additionally supplied and so forth at 13:00, and thus the marker is completely hidden. Because of this, the marker is not detected. Accordingly, the numeral 0 is stored in the detection result storage unit 320a (FIG. 19A) of the detection result storage unit 320 in a manner that is associated with the point-in-time information.

Next, a case where the products disappear abruptly, such as is the case when the large-scale theft or the bulk buying occurs, will be described.

First, because of a state (FIG. 18A) where the commodities 42 fully occupy the commodity shelving unit 40, the marker is not detected. Accordingly, the numeral 0 indicating that nothing is detected is stored in the detection result storage unit 320b (FIG. 19B) of the detection result storage unit 320 in a manner that is associated with the point-in-time information.

Figure 19B:
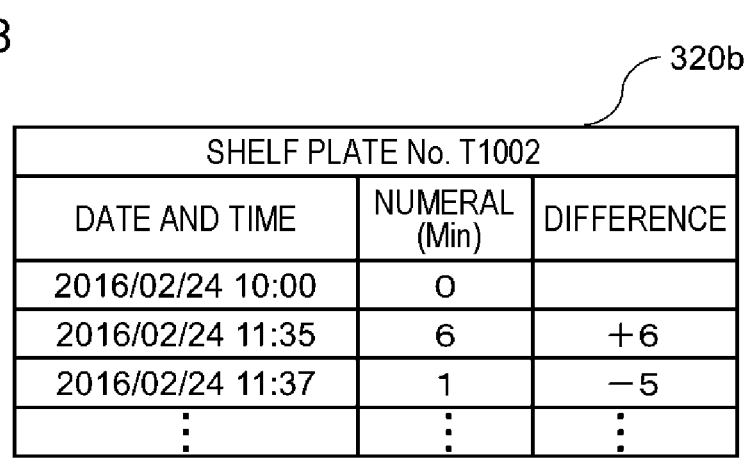

Then, when some time elapsed, the number of commodities 42 decreases, and, as illustrated in FIG. 18A, the numeral 6 appears. Because of this, the numeral 6 is recognized and the numeral 6 is stored in the detection result storage unit 320b (FIG. 19B).

Figure 18D:
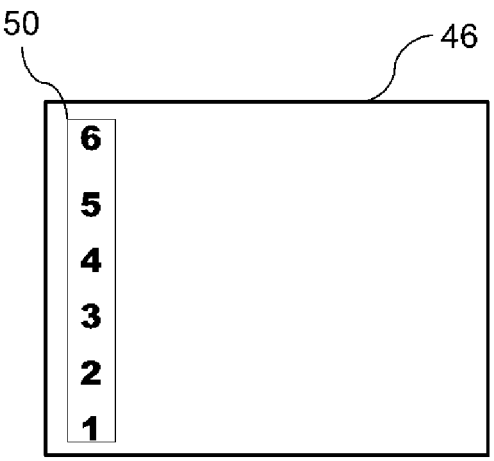

Then, moreover, when some time elapsed (for example, two minutes after the previous marker is detected), a large number of products are assumed to disappear at one time as illustrated in FIG. 18D. At this time, with the detection unit 302, the numerals 1 to 6 are recognized, and the numeral 1 that is a minimum value is stored in the detection result storage unit 320b (FIG. 19B).

In the present example embodiment, the detection unit 302, as described above, stores a result of the detection of the detected marker 50 in a time-series manner in the detection result storage unit 320. Then, the detection unit 302 further refers to the detection result storage unit 320 and thus obtains the difference between the previously detected marker 50 and the currently detected marker 50.

Obtained differences, as illustrated in FIG. 19, can be stored in each of the detection result storage unit 320a and the detection result storage unit 320b.

Then, the execution unit 304 executes a process in accordance with the difference between the detected markers 50.

Figure 20:
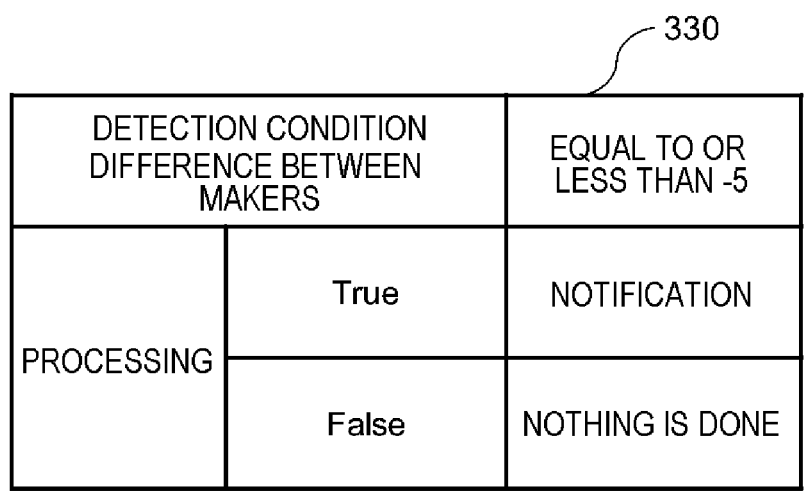
FIG. 20 is a diagram illustrating an example of the condition for the processing by the information processing apparatus according to the present example embodiment.

FIG. 20 is a diagram illustrating an example of a condition 330 for processing by the information processing apparatus 300 according to the present example embodiment.

As illustrated in the processing condition 330, in the present example embodiment, association of processing in accordance with the difference between the markers is made. For example, in the example, a process in a case where a difference in the minimum value of the numerals on the detected marker satisfies a condition, that is, a detection condition that a difference is equal to or smaller than −5 is determined.

In a case where the difference is smaller than −5, notification is performed. In a case where the condition is not satisfied, the process is not performed on anything.

In the present example embodiment, in a case where a change is detected by the image recognition processing that is performed with a predetermined period, a result of the detection is stored and a difference for every stored result of the detection is obtained. However, in a case where the result of the detection is stored with the predetermined period, a timing at which the difference is calculated and is stored, for example, can be set with a predetermined period (for example, every five minutes, or the like). Then, in a case where the storing is performed at this timing, for example, not only may a difference for every five minutes be obtained, but a difference (a sum of the results of the detection that is performed a predetermined number of times) for every 30 minutes may also be obtained. Thus, these differences may be defined as the detection conditions.

Furthermore, in another example of the processing condition 330, in a case where a change in a difference equal to or more than a predetermined value occurs within a short time, an alarm level may be set to be high and thus notification may be made. That is, alarm levels may be set in a step-by-step manner using the time of a change with the difference equal to or more than the predetermined value as a condition.

A computer program for the information processing apparatus 300 according to the present example embodiment, which is configured in this manner, will be described below.

The computer program according to the present example embodiment is written in such a manner that the computer 80 for realizing the information processing apparatus 300 is caused to execute a procedure for storing the result of the detection of the detected marker 50 in a time-series manner in the storage apparatus 310, a procedure for obtaining a difference between the previously detected marker 50 and the currently detected markers 50, and a procedure for performing processing in accordance with the difference between the detected markers 50.

The information processing method of the information processing apparatus 300 according to the present example embodiment, which is configured in this manner, will be described below.

Figure 21:
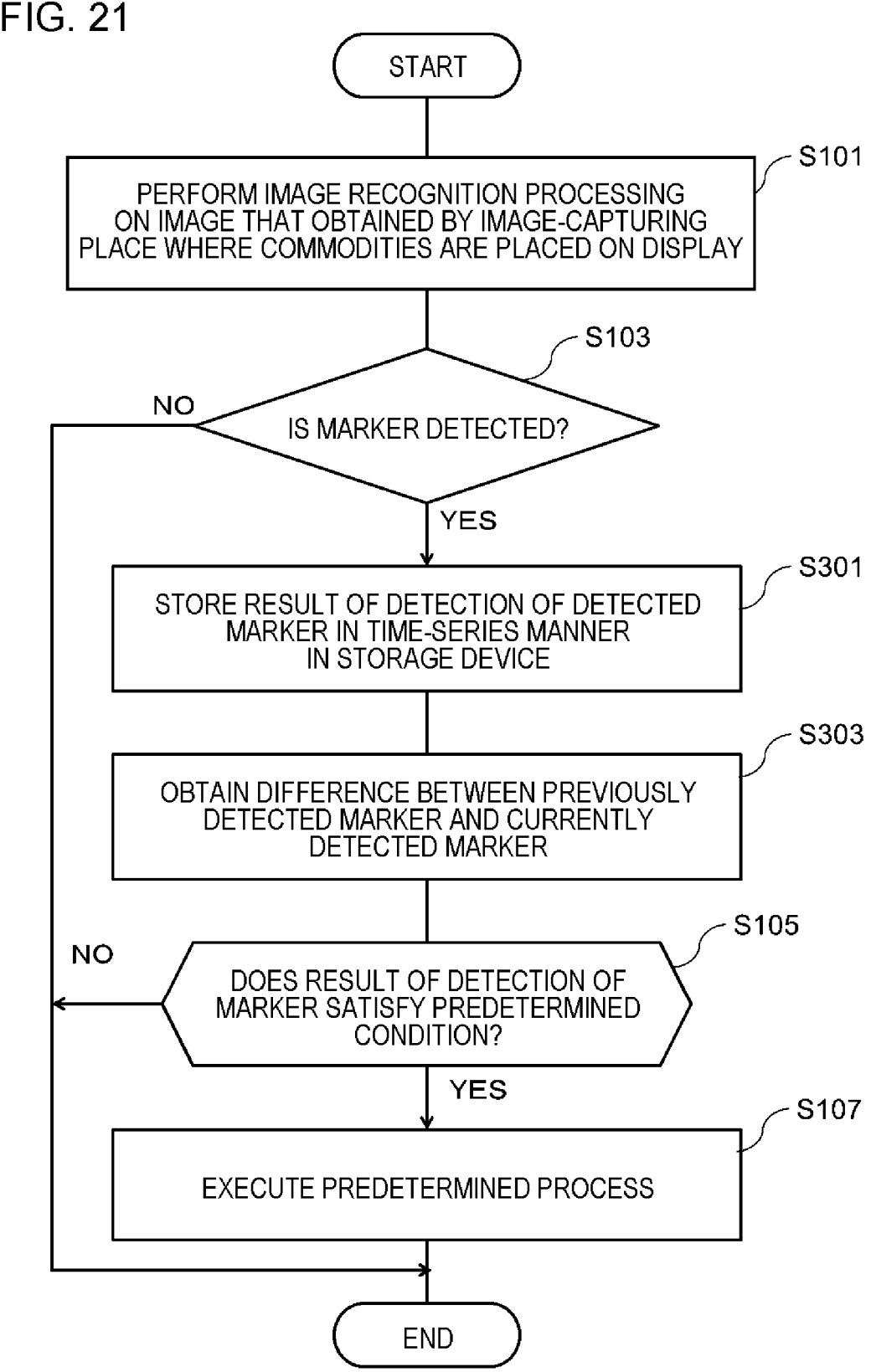
FIG. 21 is a flowchart illustrating an example of the operation of the information processing apparatus according to the present example embodiment.

FIG. 21 is a flowchart illustrating an example of operation of the information processing apparatus 300 according to the present example embodiment.

The flowchart in the information processing apparatus 300 according to the present example embodiment includes a procedure (Step S101 to Step S107) similar to those in the flowchart of the information processing apparatus 100 in FIG. 8 according to the example embodiment, which is described above, and further includes Step S301 and Step S303.

An information processing method according to the example embodiment of the present invention is an information processing method of the information processing apparatus 300, and is an information processing method that is performed by the computer 80 which realizes the information processing apparatus 200.

The information processing method according to the present example embodiment includes the information processing apparatus 300 storing the result of the detection of the detected marker 50 in a time-series manner in the storage apparatus 310 (Step S301), the information processing apparatus 300 obtaining the difference between the previously detected marker 50 and the currently detected marker 50 (Step S303), and the information processing apparatus 300 performing the process in accordance with the difference between the detected markers 50 (Step S105 and Step S107).

The detail will be described below.

First, an example of an operation at the time of normal commodity sales will be described.

First, as described with reference to FIG. 8, in Step S103, the detection unit 302 detects an image area that has the degree of similarity equal to or more than a threshold to a feature of the marker 50 which is registered in advance, as an image area of the marker 50 (YES in Step S103).

For example, as illustrated in FIGS. 18A and 18B, in a case where the number of commodities 42 decreases gradually with the passage of time, the result of the detection, as illustrated in the detection result storage unit 320a in FIG. 19A, is obtained.

The detection unit 302 obtains the difference between the previously detected marker 50 and the currently detected marker 50 (Step S303) and stores the obtained difference in the detection result storage unit 320a.

Then, the execution unit 304 refers to the processing condition 330, and because the difference between markers 50 is neither equal to nor smaller than −5 (NO in Step S105), the execution unit 304 bypasses Step S107 and ends the present processing without performing any processing.

Next, an example of an operation in a case where the products disappear abruptly, such as is the case when the large-scale theft or the bulk buying occurs, will be described.

First, as described with reference to FIG. 8, in Step S103, the detection unit 302 detects an image area that has the degree of similarity equal to or more than a threshold to a feature of the marker 50 which is registered in advance, as an image area of the marker 50 (YES in Step S103).

For example, in a case where a change occurs from a state in FIG. 18B to a state in FIG. 18D for approximately two minutes, the result of the detection is obtained as illustrated in the detection result storage unit 320b in FIG. 19B.

The detection unit 302 obtains the difference between the previously detected marker 50 and the currently detected marker 50 (Step S303) and stores the obtained difference in the detection result storage unit 320b.

Then, referring to the processing condition 330, the execution unit 304 determines that the detection condition that the difference between markers 50 is equal to or smaller than −5 is satisfied (YES in Step S105), executes a process that notifies a predetermined terminal of a message or the like indicating that a large number of commodities 42 disappear (Step S107), and ends the present processing.

In this manner, according to the present example embodiment, the difference between the previously detected marker 50 and the currently detected marker 50, and according to the difference, a process that is determined in advance can be performed. In a case where the number of commodities 42 decreases gradually such as when the commodity is sold normally, message notification processing is not performed. In a case where a large number of commodities 42 disappear at one time, the message notification processing is performed.

As described above, in the information processing apparatus 300 according to the present example embodiment, the difference between the previously detected marker 50 and the currently detected marker 50 is obtained by the detection unit 302, and the process in accordance with the difference is performed by the execution unit 304.

With this confirmation, the same effect as in the example embodiments described above is achieved, and along with this, the processing can be changed according to temporal changes of marker 50. Because of this, it is detected that a large number of commodities 42 disappear within a short time, and thus reporting is possible. Therefore, in the information processing apparatus 300 according to the present example embodiment, with a simple configuration, the large-scale theft, the bulk buying, or the like can be detected and can be notified.

The example embodiments of the present invention are described above with reference to the drawings, but these are only examples of the present invention, and various configurations other than the configurations described above can be employed.

For example, a reference marker 60 that serves as a reference for determining a target area where a marker is to be detected by a detection unit may be installed independently of the marker 50.

The detection unit 102, 202, or 302 detects the reference maker 60, and performs the detection processing of the marker 50 over a detection target area which corresponds to the detected reference marker 60.

The detection area is assumed to be defined in advance for each reference maker 60. First, the reference maker 60 is detected by the detection unit, the detection processing of the marker 50 is performed over the detection target area that corresponds to the detected reference marker 60. Furthermore, a processing condition may be provided for each detection area. That is, the identical marker 50 may be included in different detection areas respective corresponding to different reference markers 60, and processing in accordance with a processing condition that differs from one detection area to another may be performed.

Figure 22:
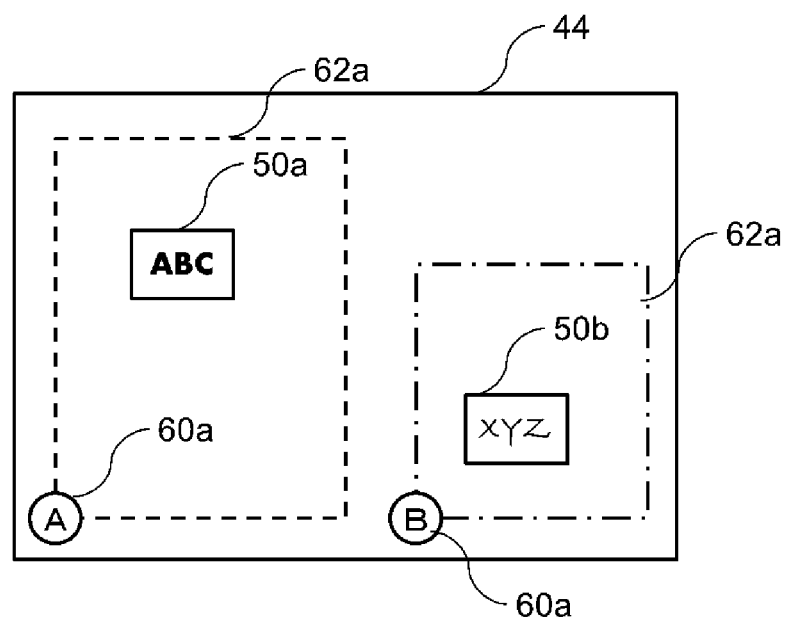
FIG. 22 is a diagram illustrating an example of the marker installation for the information processing apparatus according to the present example embodiment.

As illustrated in FIG. 22, two types of markers, a marker 50a and a marker 50b are assumed to be installed on the shelf plate 44.

An area 62a where a reference maker 60a is detected is indicated by a broken line, and an area 62b where a reference marker 60b is indicated by an alternate long- and short-dashed line.

Furthermore, in a case where the same reference markers 60 (for example, the reference marker 60a) are installed on shelf plates 44 of different commodity shelving units 40, the detection of the markers 50 may be performed on the different commodity shelving units 40 using the detection area 62a of the reference marker 60a. Furthermore, on different commodity shelving units 40, the same processing condition may be used and different processing conditions may be used over the detection area 62a of the same reference marker 60a. For example, even for detection areas 62 of the same reference marker 60, the processing condition may also be changed depending on a place such as the commodity shelving unit 40 or the floor.

With this configuration, the detection processing of the marker 50 can be performed with the detection area being narrowed. Along with this, even for the same marker 50, a different processing condition can also be set and processing different depending on the condition can be performed.

EXAMPLE

Example 1

Figure 23:
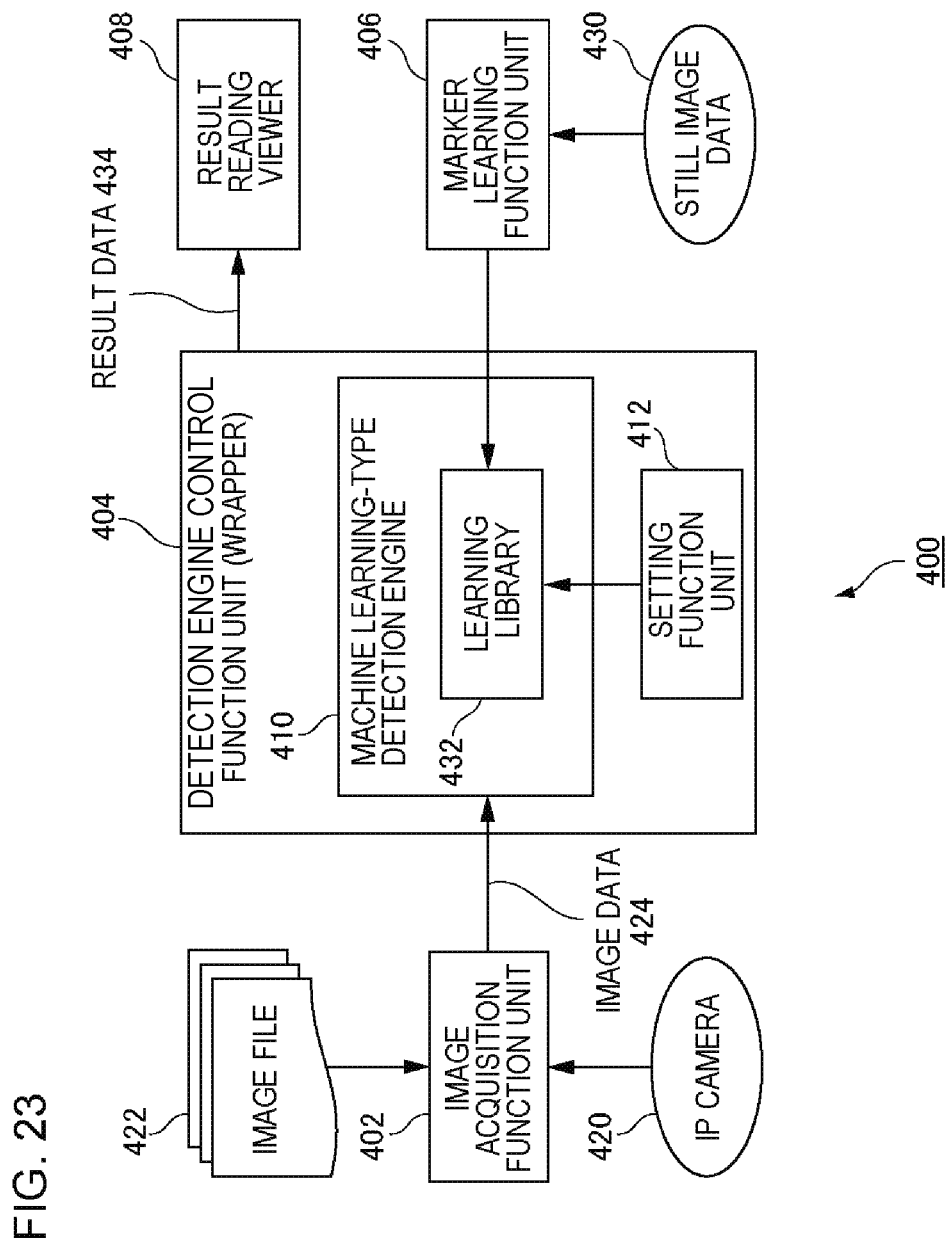
FIG. 23 is a diagram conceptually illustrating an example of a system configuration of an example of the information processing apparatus according to the present invention.

FIG. 23 is a diagram conceptually illustrating an example of a system configuration of an example of an information processing apparatus 400 according to the present invention.

In this example, the information processing apparatus 400 has an image acquisition function unit 402, a detection engine control function unit 404, a marker learning function unit 406, and a result reading viewer 408.

The image acquisition function unit 402 may acquire captured-image data (image data 424) at any time from an IP camera 420, and may read and acquire an image file 422 obtained by image-capturing in advance and stored in a storage apparatus (not illustrated), at any timing.

The image data 424 that is acquired by the image acquisition function unit 402 is delivered to the detection engine control function unit 404.

The detection engine control function unit 404 further includes a machine learning-type detection engine 410 and a setting function unit 412. The marker learning function unit 406 learns the marker 50 using a still image data 430 obtained by image-capturing the marker 50, and thus, a learning library 432 that is accordingly generated is delivered to and is registered in machine learning-type detection engine 410.

Moreover, regarding information on the marker 50, which is registered in the learning library 432, the setting function unit 412 receives setting of a corresponding process, and registers the setting in the learning library 432. That is, the setting function unit 412 has a function of setting various processing conditions, which are described above in the example embodiment.

The detection engine control function unit 404 is equivalent to each of the detection units according to the example embodiments, which are described above. The marker 50 is detected from the image data 424, and result data 434, which results from the detection, is delivered to the result reading viewer 408. At this point, as the result of the detection, a message (predetermined information), which is set by each of the execution units according to the example embodiments, which are described above, may be included in the result data 434. Through the result reading viewer 408, detection result information is provided to the manager in a readable manner. For example, the detection result information is displayed on the monitor 24 of the server computer 20 or the shop-assistant display 32 of the cash register 30 in FIG. 2.

The invention in the present application is described above with reference to the example embodiments and the example, but the invention in the present application is not limited to the example embodiments and the example. Various changes to the configuration or the detail of the invention in the present application, which can be apparent to a person skilled in the art, can be made within the scope of the invention in the present application.

Note that, in a case where information relating to a user is acquired and used according to the present invention, the acquisition and the use are supposed to be lawfully performed.

Examples of reference example embodiment will be added as appendixes below.

1. An information processing apparatus including a detection unit that detects a difference from a previously detected marker in a predetermined marker, by image recognition processing on an image obtained by image-capturing an arrangement place of an article; and an execution unit that executes a process in accordance with the difference.

2. The information processing apparatus according to 1, in which a plurality of the markers are set on the place, and in which the detection unit stores a result of the detection of the detected marker in a storage apparatus in a time-series manner and obtains a difference between the previously detected marker and the currently detected marker.

3. The information processing apparatus according to 1 or 2, further including: an identification unit that identifies a type or a place of the detected marker, in which a plurality of the markers are set on the place, and in which the execution unit executes a process in accordance with the identified type or the identified place of the marker.

4. The information processing apparatus according to 3, in which a plurality of the markers are set on the place, and in which the execution unit executes a process in accordance with a combination of the detected markers.

5. The information processing apparatus according to 3 or 4, in which the identification unit further identifies a detected range of the marker, and in which the execution unit executes a process in accordance with the range that is identified by the identification unit.

6. The information processing apparatus according to any one of 1 to 5, in which the detection unit detects a marker using a feature of the marker that is learnt by machine learning.

7. The information processing apparatus according to any one of 1 to 6, in which the predetermined process, which is executed by the execution unit includes a process of transmitting predetermined information to a predetermined terminal.

8. The information processing apparatus according to 7, in which the predetermined information includes information that identifies an image obtained by image-capturing by an image capture unit that corresponds to the detected marker.

9. The information processing apparatus according to 7 or 8, in which the predetermined information includes alert information.

10. The information processing apparatus according to any one of 1 to 9, in which the predetermined process, which is executed by the execution unit includes a process of notifying information relating to the result of the detection of the marker by the detection unit.

11. An information processing method executed by an information processing apparatus, the method including detecting a difference from a previously detected marker in a predetermined marker, by image recognition processing on an image obtained by image-capturing an arrangement place of an article; and executing a process in accordance with the difference.

12. The information processing method executed by an information processing apparatus according to 11, the method further including storing a result of the detection of the detected marker in a storage apparatus in a time-series manner and obtaining a difference between the previously detected marker and the currently detected marker, in which a plurality of the markers are set on the place.

13. The information processing method executed by an information processing apparatus according to 11 or 12, the method further including identifying a type or a place of the detected marker, and executing a process in accordance with the identified type or the identified place of the marker, in which a plurality of the markers are set to on the place.

14. The information processing method executed by an information processing apparatus according to 13, the method further including executing a process in accordance with a combination of the detected markers, in which a plurality of the markers are set t on the place.

15. The information processing method executed by an information processing apparatus according to 13 or 14, the method further including identifying a detected range of the marker; and executing a process in accordance with the identified range.

16. The information processing method executed by an information processing apparatus according to any one of 11 to 15, the method further including detecting a marker using a feature of the marker that is learnt by machine learning.

17. The information processing method executed by an information processing apparatus according to any one of 11 to 16, in which the predetermined process, which is executed, includes a process of transmitting that transmits predetermined information to a predetermined terminal.

18. The information processing method executed by an information processing apparatus according to 17, in which the predetermined information includes information that identifies an image obtained by image-capturing by an image capture unit that corresponds to the detected marker.

19. The information processing method executed by an information processing apparatus according to 17 or 18, in which the predetermined information includes alert information.

20. The information processing method executed by an information processing apparatus according to any one of 11 to 19, in which the predetermined process, which is executed, includes a process of notifying information relating to the result of the detection of the marker.

21. A program causing a computer to execute: a procedure for detecting a difference from a previously detected marker in a predetermined marker, by image recognition processing on an image obtained by image-capturing an arrangement place of an article; and a procedure for executing a process in accordance with the difference.

22. The program according to 21, causing the computer to further execute a procedure for storing a result of the detection of the detected marker in a storage apparatus in a time-series manner and a procedure for obtaining a difference between the previously detect maker and the currently detected marker, in which a plurality of the markers are set on the place.

23. The program according to 21 or 22, causing the computer to further execute a procedure for identifying a type or a place of the detected marker, and a procedure for executing a process in accordance with the identified type or the identified place of the marker, in which a plurality of the markers are set to on the place.

24. The program according to 23, causing the computer to further execute a procedure for executing a process in accordance with a combination of the detected markers, in which a plurality of the markers are set on the place.

25. The program according to 23 or 24, causing the computer to further execute a procedure for identifying a detected range of the marker, and a procedure for executing a process in accordance with the range that is identified in the procedure for identification.

26. The program according to any one of 21 to 25, causing the computer to further execute a procedure for detecting a marker using a feature of the marker that is learnt by machine learning.

27. The program according to any one of 21 to 26, in which the predetermined process, which is executed in the procedure for execution includes a process of transmitting predetermined information to a predetermined terminal.

28. The program according to 27, in which the predetermined information includes information that identifies an image obtained by image-capturing by an image capture unit that corresponds to the detected marker.

29. The program according to 27 or 28, in which the predetermined information includes alert information.

30. The program according to any one of 21 to 29, in which the predetermined process that is determined in advance, which is executed in the procedure for execution, includes a process of notifying information relating to the result of the detection of the marker in the procedure for detection.

The invention claimed is:

1. An information processing apparatus comprising:
a memory storing one or more instructions; and
a processor configured to execute the one or more instructions to:
detect a difference from a previously detected state in a predetermined marker, by image recognition processing on an image obtained by image-capturing an arrangement place of an article; and
execute a predetermined process in accordance with a time necessary for a change in a predetermined value in the difference,
wherein the processor executes the predetermined process when the time necessary for the change in the difference equal to or more than the predetermined value is lower than a threshold value, wherein the marker includes a plurality of numeral symbols, and the plurality of numeral symbols respectively corresponds to ranges of the arrangement place of the article, and wherein the processor is further configured to detect, as the difference, a difference obtained by calculating a difference between value of numeral corresponding to the numeral symbols previously recognized from the marker in the image and value of numeral corresponding to the numeral symbols currently recognized from the marker in the image, wherein the plurality of numeral symbols are arranged in ascending or descending order with respect to a direction of stacking or horizontally placing the articles, so as to appear a new numeral symbol in ascending or descending order as the number of the articles decreases, and wherein the processor is further configured to:
- obtain, when the numeral is not recognized, a predetermined maximum or minimum value of the plurality of the numeral symbols as the current numeral,
- obtain, when at least one of the numeral symbols is recognized, a maximum or minimum value of the recognized numeral symbol as the current numeral, and
- detect, as the difference, a difference between the previously obtained numeral and the currently obtained numeral.

2. The information processing apparatus according to claim 1, wherein the processor is further configured to:
identify a type or a place of the detected marker, wherein a plurality of the markers are set on the place, and
execute a process in accordance with the identified type or the identified place of the marker.

3. The information processing apparatus according to claim 2, wherein the processor is further configured to execute a process in accordance with a combination of detected markers, wherein a plurality of the markers are set on the place.

4. The information processing apparatus according to claim 1,
wherein the processor is further configured to detect a marker using a feature of the marker that is learnt by machine learning.

5. The information processing apparatus according to claim 1,
wherein the predetermined process includes a process of notifying information relating to the result of the detection of the marker.

6. The information processing apparatus according to claim 1, wherein the processor is further configured to execute, as the predetermined process, a process of outputting predetermined information.

7. The information processing apparatus according to claim 6, wherein the predetermined information includes a message to notice of the possible occurrence of a theft.

8. The information processing apparatus according to claim 7,
wherein the predetermined information includes information that identifies an image obtained by image-capturing by an image capture unit that corresponds to the detected marker.

9. The information processing apparatus according to claim 7, wherein the predetermined information includes alert information.

10. An information processing method executed by an information processing apparatus, the method comprising:

detecting a difference from a previously detected state in a predetermined marker, by image recognition processing on an image obtained by image-capturing an installation place of an article; and executing a process in accordance with a time necessary for a change in a predetermined value in the difference, wherein the predetermined process is executed when the time necessary for the change in the difference equal to or more than the predetermined value is lower than a threshold value, wherein the marker includes a plurality of numeral symbols, and the plurality of numeral symbols respectively corresponds to ranges of the arrangement place of the article, and the method further detecting, as the difference, a difference obtained by calculating a difference between value of numeral corresponding to the numeral symbols previously recognized from the marker in the image and value of numeral corresponding to the numeral symbols currently recognized from the marker in the image, wherein the plurality of numeral symbols are arranged in ascending or descending order with respect to a direction of stacking or horizontally placing the articles, so as to appear a new numeral symbol in ascending or descending order as the number of the articles decreases, and wherein the method further comprises:
- obtaining, when the numeral is not recognized, a predetermined maximum or minimum value of the plurality of the numeral symbols as the current numeral,
- obtaining, when at least one of the numeral symbols is recognized, a maximum or minimum value of the recognized numeral symbol as the current numeral, and
- detecting, as the difference, a difference between the previously obtained numeral and the currently obtained numeral.

11. A non-transitory computer readable storage medium having a program causing a computer to execute:

a procedure for detecting a difference from a previously detected state in a predetermined marker, by image recognition processing on an image obtained by image-capturing an arrangement place of an article; and a procedure for executing a process in accordance with a time necessary for a change in a predetermined value in the difference, wherein the predetermined process is executed when the time necessary for the change in the difference equal to or more than the predetermined value is lower than a threshold value, wherein the marker includes a plurality of numeral symbols, and the plurality of numeral symbols respectively corresponds to ranges of the arrangement place of the article, and the procedure further detecting, as the difference, a difference obtained by calculating a difference between value of numeral corresponding to the numeral symbols previously recognized from the marker in the image and value of numeral corresponding to the numeral symbols currently recognized from the marker in the image, wherein the plurality of numeral symbols are arranged in ascending or descending order with respect to a direction of stacking or horizontally placing the articles, so as to appear a new numeral symbol in ascending or descending order as the number of the articles decreases, and wherein the procedure further comprises:

obtaining, when the numeral is not recognized, a predetermined maximum or minimum value of the plurality of the numeral symbols as the current numeral, obtaining, when at least one of the numeral symbols is recognized, a maximum or minimum value of the recognized numeral symbol as the current numeral, and detecting, as the difference, a difference between the previously obtained numeral and the currently obtained numeral.

\* \* \* \* \*